United States Patent
Iwami et al.

(10) Patent No.: US 7,233,811 B2
(45) Date of Patent: Jun. 19, 2007

(54) RADIO DEVICE WITH TRANSMISSION DIRECTIVITY, AND CONTROL METHOD AND CONTROL PROGRAM FOR THE RADIO DEVICE

(75) Inventors: Masashi Iwami, Anpachi-gun (JP); Yoshiharu Doi, Gifu (JP); Tadayoshi Itou, Kaizu-gun (JP); Toshinori Iinuma, Anpachi-gun (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 370 days.

(21) Appl. No.: 10/450,705

(22) PCT Filed: Dec. 21, 2001

(86) PCT No.: PCT/JP01/11310

§ 371 (c)(1),
(2), (4) Date: Jun. 23, 2003

(87) PCT Pub. No.: WO02/052751

PCT Pub. Date: Jul. 4, 2002

(65) Prior Publication Data

US 2004/0053581 A1    Mar. 18, 2004

(30) Foreign Application Priority Data

Dec. 25, 2000   (JP) .............................. 2000-393034

(51) Int. Cl.
*H04B 7/02*   (2006.01)

(52) U.S. Cl. ...................... 455/561; 455/101; 455/303; 370/332; 375/297; 375/347

(58) Field of Classification Search ................ 455/101, 455/561, 303, 305, 504, 562.1; 375/299, 375/347; 370/332, 319
See application file for complete search history.

(56) References Cited

U.S. PATENT DOCUMENTS

| | | | | | |
|---|---|---|---|---|---|
| 5,819,168 | A | * | 10/1998 | Golden et al. | ............... 455/303 |
| 5,960,039 | A | * | 9/1999 | Martin et al. | ............... 375/267 |
| 6,006,110 | A | * | 12/1999 | Raleigh | ....................... 455/561 |
| 6,498,928 | B1 | * | 12/2002 | Hiramatsu | ............... 455/278.1 |

(Continued)

FOREIGN PATENT DOCUMENTS

EP     0 869 578 A1    10/1998

(Continued)

OTHER PUBLICATIONS

B. Widrow et al.; Proceedings of the IEEE, vol. 55, No. 12, pp. 2143-2159, Dec. 1967.

(Continued)

*Primary Examiner*—Edward F. Urban
*Assistant Examiner*—Adeel Haroon
(74) *Attorney, Agent, or Firm*—Westerman, Hattori, Daniels & Adrian, LLP.

(57) ABSTRACT

In an adaptive array (2000), fading rate of a user is measured by a fading rate measuring circuit (2300), and the transmit weight vector is weighted in accordance with the fading rate by a transmitting circuit (2400). Thus, transmission power is increased for a user of which fading rate is large, and thus transmission directivity control for such a user becomes possible.

24 Claims, 18 Drawing Sheets

U.S. PATENT DOCUMENTS 6,636,493 B1 * 10/2003 Doi et al. .................. 370/332

FOREIGN PATENT DOCUMENTS

| JP | 7-87011 | 3/1995 |
| JP | 08-274687 | 10/1996 |
| JP | 9-200115 | 7/1997 |
| JP | 10-065610 | 3/1998 |
| JP | 11-032030 | 2/1999 |
| JP | 2000-209140 | 7/2000 |
| JP | 2002-051375 | 2/2002 |

OTHER PUBLICATIONS

S. P. Applebaum, IEEE Trans. Antennas & Propag. vol. AP-24, No. 5, pp. 585-598, Sep. 1976.

B. Widrow et al.; Adaptive Signal Processing, Chapter 6, Part III, pp. 99-116, Prentice-Hall, 1985.

R. Monzingo et al.; A Wiley-Interscience Pub. Chapter 3, pp. 78-105, 1980.

J. E. Hudson, IEE Electromagnetic Wave Series, Chapter 3, pp. 59-154, 1981.

R. T. Compton, Jr.; Adaptive Antennas, Chapter 2, pp. 6-11, 1988.

E. Nicolau et al.; Elsevier, Chapter 8, pp. 122-163, 1989.

Office Action from Japanese Patent Office mailed Jan. 10, 2006 and English language translation.

Office Action from the Japanese Patent Office dated Sep. 5, 2006 in the corresponding Japanese Patent Application No. 2002-553331.

* cited by examiner

FIG.7

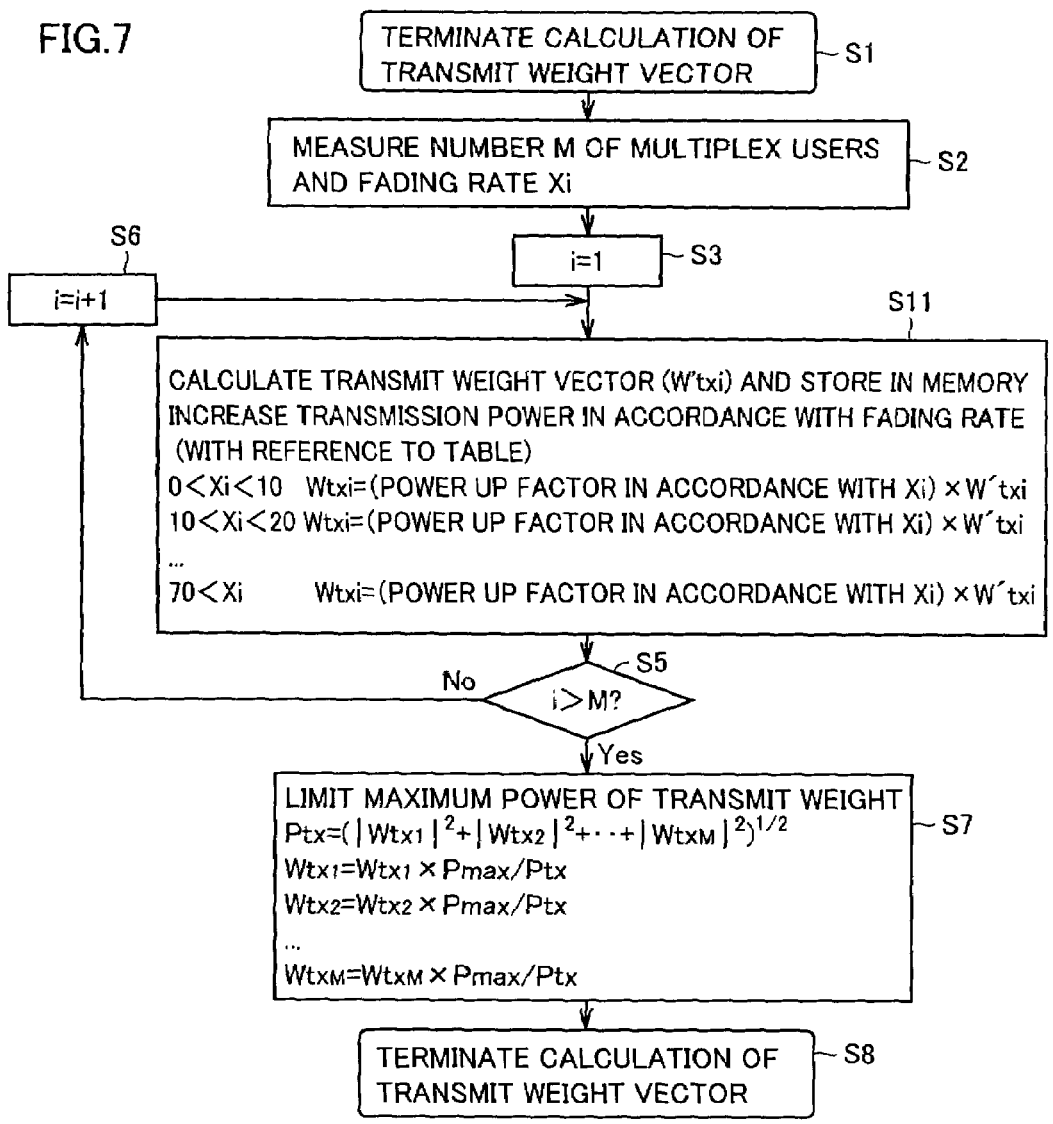

S1 TERMINATE CALCULATION OF TRANSMIT WEIGHT VECTOR

S2 MEASURE NUMBER M OF MULTIPLEX USERS AND FADING RATE Xi

S3 i=1

S6 i=i+1

S11 CALCULATE TRANSMIT WEIGHT VECTOR (W'txi) AND STORE IN MEMORY
INCREASE TRANSMISSION POWER IN ACCORDANCE WITH FADING RATE
(WITH REFERENCE TO TABLE)
$0 < Xi < 10$  Wtxi=(POWER UP FACTOR IN ACCORDANCE WITH Xi) × W'txi
$10 < Xi < 20$ Wtxi=(POWER UP FACTOR IN ACCORDANCE WITH Xi) × W'txi
...
$70 < Xi$     Wtxi=(POWER UP FACTOR IN ACCORDANCE WITH Xi) × W'txi S5 i>M?

S7 LIMIT MAXIMUM POWER OF TRANSMIT WEIGHT
$Ptx=(|Wtx1|^2+|Wtx2|^2+\cdots+|WtxM|^2)^{1/2}$
Wtx1=Wtx1 × Pmax/Ptx
Wtx2=Wtx2 × Pmax/Ptx
...
WtxM=WtxM × Pmax/Ptx

S8 TERMINATE CALCULATION OF TRANSMIT WEIGHT VECTOR

FIG.8

| FADING RATE [Hz] | POWER UP FACTOR |
|---|---|
| $0 < X < 10$ | 1.000 |
| $10 < X < 20$ | 1.122 |
| $20 < X < 30$ | 1.259 |
| $30 < X < 40$ | 1.413 |
| $40 < X < 50$ | 1.585 |
| $50 < X < 60$ | 1.778 |
| $60 < X < 70$ | 1.995 |
| $70 < X$ | 2.239 |

RADIO DEVICE WITH TRANSMISSION DIRECTIVITY, AND CONTROL METHOD AND CONTROL PROGRAM FOR THE RADIO DEVICE

TECHNICAL FIELD

The present invention relates to a radio apparatus having transmission directivity, a method of controlling the same, and a control program therefor. More particularly, the present invention relates to a radio apparatus employed in an adaptive array radio base station, a method of controlling the same, and a control program for the same.

BACKGROUND ART

An adaptive array radio base station employing an array antenna is recently put into practice as a radio base station for a mobile communication system such as a mobile telephone. The operation principles of such adaptive array radio base stations are described in the following literature, for example:

B. Widrow, et al. "Adaptive Antenna Systems," Proc. IEEE, vol. 55, No. 12, pp. 2143–2159 (December 1967).

S. P. Applebaum, "Adaptive Arrays," IEEE Trans. Antennas & Propag., vol. AP-24, No. 5, pp. 585–598 (September 1976).

O. L. Frost, III, "Adaptive Least Squares Optimization Subject to Linear Equality Constraints," SEL-70-055, Technical Report No. 6796-2, Information System Lab., Stanford Univ. (August 1970).

B. Widrow and S. D. Stearns, "Adaptive Signal Processing," Prentice-Hall, Englewood Cliffs (1985).

R. A. Monzingo and T. W. Miller, "Introduction to Adaptive Arrays," John Wiley & Sons, New York (1980).

J. E. Hudson, "Adaptive Array Principles," Peter Peregrinus Ltd., London (1981).

R. T. Compton, Jr., "Adaptive Antennas-Concepts and Performance," Prentice-Hall, Englewood Cliffs (1988).

E. Nicolau and D. Zaharia, "Adaptive Arrays," Elsevier, Amsterdam (1989).

FIG. 17 is a model diagram schematically showing the operation principle of such adaptive array radio base stations. Referring to FIG. 17, an adaptive array radio base station 1 includes an array antenna 2 formed by n antennas #1, #2, #3, . . . , #n. A first area 3 with slant lines shows the range capable of receiving radio waves from the radio base station 1. A second area 7 with slant lines shows the range capable of receiving radio waves from another radio base station 6 adjacent to the radio base station 1.

In the area 3, a mobile telephone 4 serving as a terminal of a user A transmits/receives a radio signal to/from the adaptive array radio base station 1 (arrow 5). In the area 5, on the other hand, a mobile telephone 8 serving as a terminal of another user B transmits/receives a radio signal to/from the radio base station 6 (arrow 9).

If the radio signal employed in the mobile telephone 4 of the user A is by chance equal in frequency to that employed in the mobile telephone 8 of the user B, the radio signal from the mobile telephone 8 of the user B may act as an undesired interference signal in the area 3 depending on the position of the user B, to be mixed into the radio signal between the mobile telephone 4 of the user A and the adaptive array radio base station 1.

In this case, the adaptive array radio base station 1 receives the radio signals from the users A and B in a mixed state if taking no measures, to disadvantageously disturb communication with the user A.

In order to eliminate the signal from the user B from the received signals, the adaptive array radio base station 1 employs the following structure and processing.

[Structure of Adaptive Array Antenna]

FIG. 18 is a block diagram showing the structure of an adaptive array 100. Referring to FIG. 18, the adaptive array 100 is provided with n input ports 20-1 to 20-n, in order to extract a signal of a desired user from input signals including a plurality of user signals. Signals received in the input ports 20-1 to 20-n are supplied to a weight vector control part 11 and multipliers 12-1 to 12-n through switching circuits 1-1 to 10-n.

The weight vector control part 11 calculates weight vectors $w_{1i}$ to $w_{1n}$ with a training signal corresponding to the signal of a specific user previously stored in a memory 14 and an output of an adder 13. Each subscript i indicates that the weight vector is employed for transmission/receiving to/from an i-th user.

The multipliers 12-1 to 12-n multiply the input signals from the input ports 20-1 to 20-n by the weight vectors $w_{1i}$ to $w_{1n}$ respectively and supply the results to the adder 13. The adder 13 adds up the output signals from the multipliers 12-1 to 12-n and outputs the result as a received signal $S_{RX}(t)$, which in turn is also supplied to the weight vector control part 11.

The adaptive array 100 further includes multipliers 15-1 to 15-n receiving an output signal $S_{TX}(t)$ from the adaptive array radio base station 1, multiplying the same by the weight vectors $w_{1i}$ to $w_{1n}$ supplied from the weight vector control part 11 and outputting the results. The outputs of the multipliers 15-1 to 15-n are supplied to the switching circuits 10-1 to 10-n respectively. The switching circuits 10-1 to 10-n supply the signals received from the input ports 20-1 to 20-n to a signal receiving part 1R in receiving, while supplying signals from a signal transmission part 1T to the input/output ports 20-1 to 20-n in signal transmission.

[Operation Principle of Adaptive Array]

The operation principle of the signal receiving part 1R shown in FIG. 18 is now briefly described.

In order to simplify the illustration, it is hereafter assumed that the number of antenna elements is four and the number of users PS from which signals are simultaneously received is two. In this case, signals $RX_1(t)$ to $RX_4(t)$ supplied from the antennas to the receiving part 1R are expressed as follows:

$$RX_1(t)=h_{11}Srx_1(t)+h_{12}Srx_2(t)+n_1(t) \quad (1)$$

$$RX_2(t)=h_{21}Srx_1(t)+h_{22}Srx_2(t)+n_2(t) \quad (2)$$

$$RX_3(t)=h_{31}Srx_1(t)+h_{32}Srx_2(t)+n_3(t) \quad (3)$$

$$RX_4(t)=h_{41}Srx_1(t)+h_{42}Srx_2(t)+n_4(t) \quad (4)$$

where $RX_j(t)$ represents a signal received in a j-th (j=1, 2, 3, 4) antenna, and $Srx_i(t)$ represents a signal transmitted from an i-th (i=1, 2) user.

Further, $h_{ji}$ represents a complex factor of the signal from the i-th user received by the j-th antenna, and $n_j(t)$ represents noise included in the j-th received signal.

The above equations (1) to (4) are expressed in vector forms as follows:

$$X(t)=H_1Srx_1(t)+H_2Srx_2(t)+N(t) \quad (5)$$

$$X(t)=[RX_1(t),RX_2(t), \ldots ,RX_n(t)]^T \quad (6)$$

$$H_i=[h_{1i},h_{2i},\ldots,h_{ni}]^T, (i=1,2) \quad (7)$$

$$N(t)=[n_1(t),n_2(t),\ldots,n_n(t)]^T \quad (8)$$

In the above equations (6) to (8), [ . . . ]$^T$ shows transposition of [ . . . ]. Here, X(t) represents an input signal vector, H$_i$ represents a received signal factor vector of the i-th user, and N(t) represents a noise vector respectively.

As shown in FIG. 18, the adaptive array outputs a signal formed by multiplying the input signals from the respective antennas by the weighting factors $w_{1i}$ to $w_{1n}$ as the received signal $S_{RX}(t)$. The number n of the antennas is four.

When extracting the signal Srx$_1$(t) transmitted from the first user, for example, the adaptive array operates under the aforementioned preparation as follows:

An output signal y1(t) from the adaptive array 100 can be expressed by multiplying the input signal vector X(t) by a weight vector W$_1$ as follows:

$$y1(t)=X(t)W_1^T \quad (9)$$

$$W_1=[w_{11},w_{21},w_{31},w_{41}]^T \quad (10)$$

The weight vector W$_1$ has the weighting factor $w_{j1}$ (j=1, 2, 3, 4) multiplied by the j-th input signal RX$_j$(t) as its element.

Substitution of the input signal vector X(t) expressed in the equation (5) into y1(t) expressed in the equation (9) gives the following equation:

$$y1(t)=H_1W_1^TSrx_1(t)+H_2W_1^TSrx_2(t)+N(t)W_1^T \quad (11)$$

When the adaptive array 100 ideally operates, the weight vector control part 11 sequentially controls the weight vector W$_1$ by the well-known method described in the above literature, to satisfy the following simultaneous equations:

$$H_1W_1^T=1 \quad (12)$$

$$H_2W_1^T=0 \quad (13)$$

When the weight vector W$_1$ is completely controlled to satisfy the equations (12) and (13), the output signal y1(t) from the adaptive array 100 is ultimately expressed as follows:

$$y1(t)=Srx_1(t)+N_1(t) \quad (14)$$

$$N_1(t)=n_1(t)w_{11}+n_2(t)w_{21}+n_3(t)w_{31}+n_4(t)w_{41} \quad (15)$$

In other words, the signal Srx$_1$(t) transmitted from the first one of the two users is obtained as the output signal y1(t).

Referring to FIG. 18, the input signal $S_{TX}(t)$ for the adaptive array 100 is supplied to the transmission part 1T in the adaptive array 100 and supplied to first inputs of the multipliers 15-1, 15-2, 15-3, . . . , 15-n. The weight vectors $w_{1i}$, $w_{2i}$, $w_{3i}$, . . . , $w_{ni}$ calculated by the weight vector control part 11 on the basis of the received signals in the aforementioned manner are copied and applied to second inputs of the multipliers 15-1, 15-2, 15-3, . . . , 15-n respectively.

The input signal weighted by the multipliers is transmitted to the corresponding antennas #1, #2, #3, . . . , #n through the corresponding switching circuits 10-1, 10-2, 10-3, . . . , 10-n respectively, and transmitted into the area 3 shown in FIG. 17.

The users A and B are identified as follows: The radio signal from each mobile telephone is transmitted in a frame structure. The radio signal from the portable telephone is roughly formed by a preamble formed by a signal series known to the radio base station and data (voice etc.) formed by a signal series known to the radio base station.

The signal series of the preamble includes a signal string of information for determining whether or not the user is a desired user for making communication with the radio base station. The weight vector control part 11 of the adaptive array radio base station 1 contrasts the training signal corresponding to the user A fetched from the memory 14 with the received signal series and performs weight vector control (decision of the weighting factor) to extract a signal seeming to include the signal series corresponding to the user A.

FIG. 19 is a diagram imaging transfer of the radio signal between the user A and the adaptive array radio base station 1.

The signal transmitted through the same array antenna 2 as that in receiving is subjected to weighting targeting the user A similarly to the received signal, and hence the transmitted radio signal is received by the mobile telephone 4 of the user A as if having directivity to the user A.

When outputting the radio signal to the area 3 showing the range capable of receiving radio waves from the adaptive array radio base station 1 as shown in FIG. 17 while properly controlling the adaptive array antenna as shown in FIG. 19, it follows that the adaptive array radio base station 1 outputs a radio signal having directivity targeting the mobile telephone 4 of the user A as shown in an area 3a in FIG. 19.

As described above, the adaptive array radio base station 1 can transmit/receive a radio signal having directivity targeting a specific user, whereby a path division multiple access (PDMA) mobile communication system can be implemented as described below.

In order to efficiently utilize frequencies in a mobile communication system such as a mobile telephone, there are proposed various transmission channel allocation systems including the aforementioned PDMA system.

FIG. 20 shows arrangements of channels in various communication systems including frequency division multiple access (FDMA), time division multiple access (TDMA) and PDMA systems.

With reference to FIG. 20, the FDMA, TDMA and PDMA systems are now briefly described. In the FDMA channel allocation system shown in FIG. 20(*a*), analog signals from users 1 to 4 are frequency-divided and transmitted through radio waves of different frequencies f1 to f4. The signals from the users 1 to 4 are separated through a frequency filter.

In the TDMA system shown in FIG. 20(*b*), a digitized signal from each user is time-divided every constant time (time slot) and transmitted through radio waves of different frequencies f1 to f4. The signal from each user is separated through a frequency filter and time synchronization from a base station and a mobile terminal unit of each user.

On the other hand, the PDMA system shown in FIG. 20(*c*) spatially divides a single time slot at the same frequency for transmitting data of a plurality of users. In the PDMA system, the signal of each user is separated through a frequency filter, time synchronization between a base station and a mobile terminal unit of each user and a mutual interference eliminator employing an adaptive array or the like.

When employing the PDMA system, as shown in FIG. 19, not only radio signals transferred between different radio base stations and two users corresponding to the radio base stations must be separated not to mutually interfere with each other but also mutual interference between radio signals transmitted/received to/in different users with the same frequency and the same time slot in the area belonging to the same adaptive array radio base station 1 must be eliminated.

In the example shown in FIG. 19, it is possible to prevent the radio signal from the terminal of the user B transmitting/receiving the radio signal to/from the adjacent base station from interfering the radio signal of the user A transmitting/receiving the radio signal to/from the adaptive array radio base station 1 by utilizing directivity through the adaptive array antenna 2.

There may be such a situation that condition of radio transmission path between a desired user A and adaptive array radio base station 1 changes because of rapid movement of the user A, resulting in a change in intensity of the radiowave signals (fading).

In a communication utilizing space division multiplexing such as in the PDMA system, when the degree of such fading increases, it becomes difficult at adaptive array radio base station 1 to control directivity to the desired user A, and directivity would be deviated from the user A.

The present invention was made to solve the above described problem, and an object is to provide, in a system of transmitting/receiving radiowave signals in accordance with the PDMA system, a radio apparatus having transmission directivity, a method and a control program of controlling transmission directivity that prevent deviation of directivity to a desired terminal caused by fading.

Another object of the present invention is to provide, in a system for transmitting/receiving radiowave signals in accordance with the PDMA system, a radio apparatus having transmission directivity, a method and a control program of controlling transmission directivity that enable more exact directivity control to a desired terminal, by utilizing, in addition to transmission directivity control based on fading, transmission directivity control based on received power.

DISCLOSURE OF THE INVENTION

The present invention provides a radio apparatus having transmission directivity for performing path division multiple access with a plurality of terminal units, including: receiving means for separating a received signal from a specific one of the terminal units from a reception radio signal, the receiving means including a plurality of received signal separating means for multiplying the received radio signal by a reception weight vector corresponding to each terminal unit thereby extracting the received signal, and fading rate measuring means for measuring fading rate of each of the terminal units; the radio apparatus further including: transmitting means for generating a transmit signal having directivity to the specific terminal unit, the transmitting means including a plurality of transmit signal generating means for multiplying a transmit signal by a transmit weight vector obtained by weighting the reception weight vector for each terminal unit in response to the fading rate from the fading rate measuring means thereby generating the transmit signal having directivity.

Preferably, the transmitting means multiplies the reception weight vector by a factor proportionate to $X_i$ thereby generating the transmit weight vector for an i-th terminal unit, where M (M: natural number) represents the number of the plurality of terminal units, and $X_i$ represents the fading rate from the i-th (i: natural number) terminal unit among the plurality of terminal units.

More preferably, the transmitting means multiplies the reception weight vector by a factor proportionate to $(X_i - F_0)$ only when $X_i$ is equal to or greater than a prescribed fading rate $F_0$, thereby generating the transmit weight vector for an i-th terminal unit, where M (M: natural number) represents the number of the plurality of terminal units, and $X_i$ represents the fading rate from the i-th (i: natural number) terminal unit among the plurality of terminal units.

More preferably, the transmitting means multiplies the reception weight vector by a factor determined in accordance with $X_i$ from a table including a plurality of factors set in advance for every prescribed range of the fading rate, thereby generating the transmit weight vector for an i-th terminal unit, where M (M: natural number) represents the number of the plurality of terminal units, and $X_i$ represents the fading rate from the i-th (i: natural number) terminal unit among the plurality of terminal units.

According to another aspect, the present invention provides a radio apparatus having transmission directivity for performing path division multiple access with a plurality of terminal units, including: receiving means for separating a received signal from a specific one of the terminal units from a received radio signal, the receiving means including: a plurality of received signal separating means for multiplying the received radio signal by a reception weight vector corresponding to each terminal unit thereby extracting the received signal, received strength measuring means for measuring received radio strength of each terminal unit, and fading rate measuring means for measuring fading rate of each of the terminal units; the radio apparatus further including: transmitting means for generating a transmit signal having directivity to the specific terminal unit, the transmitting means including a plurality of transmit signal generating means for multiplying a transmit signal by a transmit weight vector obtained by weighting the reception weight vector for each terminal unit in response to the received radio strength from the received strength measuring means and the fading rate from the fading rate measuring means thereby generating the transmit signal having directivity.

Preferably, the transmitting means multiplies the reception weight vector by a factor proportionate to $X_i$ thereby generating the transmit weight vector for an i-th terminal unit, where M (M: natural number) represents the number of the plurality of terminal units, and $X_i$ represents the fading rate from the i-th (i: natural number) terminal unit among the plurality of terminal units.

More preferably, the transmitting means multiplies the reception weight vector by a factor proportionate to $(X_i - F_0)$ only when $X_i$ is equal to or greater than a prescribed fading rate $F_0$, thereby generating the transmit weight vector for an i-th terminal unit, where M (M: natural number) represents the number of the plurality of terminal units, and $X_i$ represents the fading rate from the i-th (i: natural number) terminal unit among the plurality of terminal units.

More preferably, the transmitting means multiplies the reception weight vector by a factor determined in accordance with $X_i$ from a table including a plurality of factors set in advance for every prescribed range of the fading rate, thereby generating the transmit weight vector for an i-th terminal unit, where M (M: natural number) represents the number of the plurality of terminal units, and $X_i$ represents the fading rate from the i-th (i: natural number) terminal unit among the plurality of terminal units.

According to a still further aspect, the present invention provides a method of controlling a radio apparatus having transmission directivity for performing path division multiple access with a plurality of terminal units, including the steps of: deriving a reception weight vector corresponding to each terminal unit in real time and separating a received signal from the terminal unit; measuring fading rate of each of the terminal units; deriving a transmit weight vector obtained by weighting the reception weight vector in accordance with the measured fading rate for each terminal unit; and multiplying a transmit signal by the transmit weight vector to generate a transmit signal having directivity.

Preferably, in the step of weighting the reception vector, the transmit weight vector for an i-th terminal unit is generated by multiplying the reception weight vector by a factor proportionate to Xi, where M (M: natural number) represents the number of the plurality of terminal units, and Xi represents the fading rate from the i-th (i: natural number) terminal unit among the plurality of terminal units.

More preferably, in the step of weighting the reception vector, the transmit weight vector for an i-th terminal unit is generated by multiplying the reception weight vector by a factor proportionate to $(Xi-F_0)$ only when Xi is equal to or greater than a prescribed fading rate $F_0$, where M (M: natural number) represents the number of the plurality of terminal units, and Xi represents the fading rate from the i-th (i: natural number) terminal unit among the plurality of terminal units.

More preferably, in the step of weighting the reception vector, the transmit weight vector for an i-th terminal unit is generated by multiplying the reception weight vector by a factor determined in accordance with Xi from a table including a plurality of factors set in advance for every prescribed range of the fading rate, where M (M: natural number) represents the number of the plurality of terminal units, and Xi represents the fading rate from the i-th (i: natural number) terminal unit among the plurality of terminal units.

According to a still further aspect, the present invention provides a method of controlling a radio apparatus having transmission directivity for performing path division multiple access with a plurality of terminal units, including the steps of: deriving a reception weight vector corresponding to each terminal unit in real time and separating a received signal from the terminal unit; measuring received radio strength of each terminal unit on the basis of a received radio signal and the separated received signal; measuring fading rate of each of the terminal units; deriving a transmit weight vector obtained by weighting the reception weight vector in accordance with the measured received radio strength and fading rate for each terminal unit; and multiplying a transmit signal by the transmit weight vector to generate a transmit signal having directivity.

Preferably, in the step of weighting the reception vector, the transmit weight vector for an i-th terminal unit is generated by multiplying the reception weight vector by a factor proportionate to Xi, where M (M: natural number) represents the number of the plurality of terminal units, and Xi represents the fading rate from the i-th (i: natural number) terminal unit among the plurality of terminal units.

More preferably, in the step of weighting the reception vector, the transmit weight vector for an i-th terminal unit is generated by multiplying the reception weight vector by a factor proportionate to $(Xi-F_0)$ only when Xi is equal to or greater than a prescribed fading rate $F_0$, where M (M: natural number) represents the number of the plurality of terminal units, and Xi represents the fading rate from the i-th (i: natural number) terminal unit among the plurality of terminal units.

More preferably, in the step of weighting the reception vector, the transmit weight vector for an i-th terminal unit is generated by multiplying the reception weight vector by a factor determined in accordance with Xi from a table including a plurality of factors set in advance for every prescribed range of the fading rate, where M (M: natural number) represents the number of the plurality of terminal units, and Xi represents the fading rate from the i-th (i: natural number) terminal unit among the plurality of terminal units.

According to a still further aspect, the present invention provides a control program for a radio apparatus having transmission directivity for performing path division multiple access with a plurality of terminal units, for making a computer execute the steps of: deriving a reception weight vector corresponding to each terminal unit in real time and separating a received signal from the terminal unit; measuring fading rate of each of the terminal units; deriving a transmit weight vector obtained by weighting the reception weight vector in accordance with the measured fading rate for each terminal unit; and multiplying a transmit signal by the transmit weight vector to generate a transmit signal having directivity.

Preferably, in the step of weighting the reception vector, the transmit weight vector for an i-th terminal unit is generated by multiplying the reception weight vector by a factor proportionate to Xi, where M (M: natural number) represents the number of the plurality of terminal units, and Xi represents the fading rate from the i-th (i: natural number) terminal unit among the plurality of terminal units.

More preferably, in the step of weighting the reception vector, the transmit weight vector for an i-th terminal unit is generated by multiplying the reception weight vector by a factor proportionate to $(Xi-F_0)$ only when Xi is equal to or greater than a prescribed fading rate $F_0$, where M (M: natural number) represents the number of the plurality of terminal units, and Xi represents the fading rate from the i-th (i: natural number) terminal unit among the plurality of terminal units.

More preferably, in the step of weighting the reception vector, the transmit weight vector for an i-th terminal unit is generated by multiplying the reception weight vector by a factor determined in accordance with Xi from a table including a plurality of factors set in advance for every prescribed range of the fading rate, where M (M: natural number) represents the number of the plurality of terminal units, and Xi represents the fading rate from the i-th (i: natural number) terminal unit among the plurality of terminal units.

According to a still further aspect, the present invention provides a control program for a radio apparatus having transmission directivity for performing path division multiple access with a plurality of terminal units, for making a computer execute the steps of: deriving a reception weight vector corresponding to each terminal unit in real time and separating a received signal from the terminal unit; measuring received radio strength of each terminal unit on the basis of a received radio signal and the separated received signal; measuring fading rate of each of the terminal units; deriving a transmit weight vector obtained by weighting the received weight vector in accordance with the measured received radio strength and fading rate for each terminal unit; and multiplying a transmit signal by the transmit weight vector to generate a transmit signal having directivity.

Preferably, in the step of weighting the reception vector, the transmit weight vector for an i-th terminal unit is generated by multiplying the reception weight vector by a factor proportionate to Xi, where M (M: natural number) represents the number of the plurality of terminal units, and Xi represents the fading rate from the i-th (i: natural number) terminal unit among the plurality of terminal units.

More preferably, in the step of weighting the reception vector the transmit weight vector for an i-th terminal unit is generated by multiplying the reception weight vector by a factor proportionate to $(Xi-F_0)$ only when Xi is equal to or greater than a prescribed fading rate $F_0$, where M (M: natural number) represents the number of the plurality of terminal units, and Xi represents the fading rate from the i-th (i: natural number) terminal unit among the plurality of terminal units.

More preferably, in the step of weighting the reception vector, the transmit weight vector for an i-th terminal unit is generated by multiplying the reception weight vector by a factor determined in accordance with Xi from a table including a plurality of factors set in advance for every prescribed range of the fading rate, where M (M: natural number) represents the number of the plurality of terminal units, and Xi represents the fading rate from the i-th (i: natural number) terminal unit among the plurality of terminal units.

Therefore, according to the radio apparatus capable of transmission directivity control, the transmission directivity control method and control program in accordance with the present invention, when radiowave signals are to be transmitted/received to/from a terminal of which directivity is deviated because of fading, transmission power from the base station is increased in accordance with the magnitude of fading rate of the user, whereby transmission directivity control can be recovered.

By combining with the conventional transmission power control based on the measurements of reception power, more exact transmission directivity control is realized.

BRIEF DESCRIPTION OF THE DRAWINGS

FIG. 7 is a flow chart illustrating a third method of controlling transmission directivity by the adaptive array 2000 in accordance with the first embodiment of the present invention;

FIG. 8 is a diagram showing a table defining relation between fading rates and power-up factors used for the control method of FIG. 7;

BEST MODES FOR CARRYING OUT THE INVENTION

First Embodiment

Figure 1:
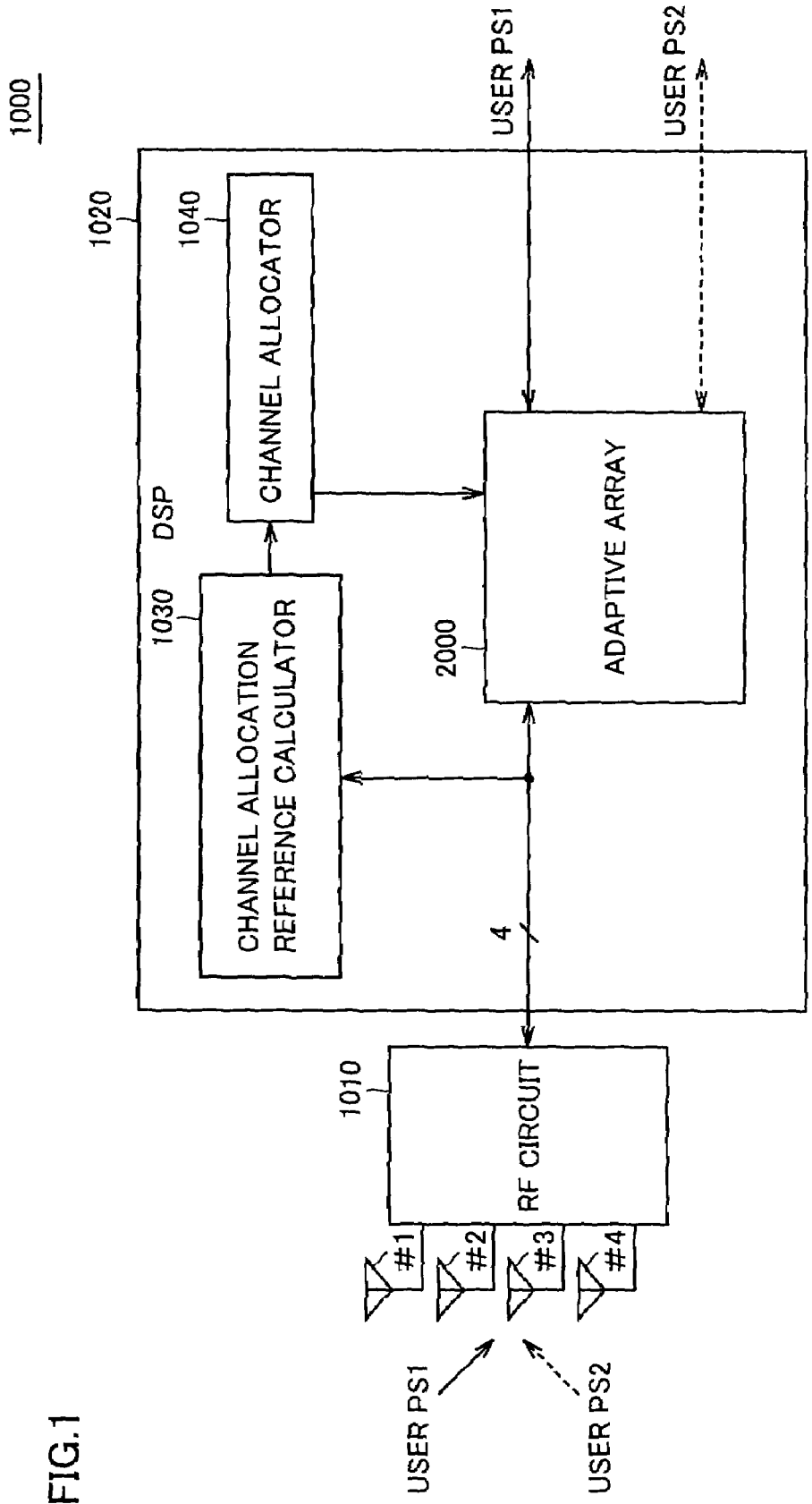
FIG. 1 is a schematic block diagram showing the structure of a radio apparatus according to an embodiment of the present invention.

FIG. 1 is a schematic block diagram showing the structure of a transmission/receiving system 1000 of a PDMA base station.

In the structure shown in FIG. 1, four antennas #1 to #4 are provided for identifying users PS1 and PS2.

In receiving, outputs of the antennas #1 to #4 are supplied to an RF circuit 1010, amplified by a receiving amplifier and frequency-converted by a local oscillation signal in the RF circuit 1010, thereafter subjected to removal of undesired frequency components through a filter, A–D converted and thereafter supplied to a digital signal processor 1020 as digital signals.

The digital signal processor 1020 is provided with a channel allocation reference calculator 1030, a channel allocator 1040 and an adaptive array 2000. The channel allocation reference calculator 1030 previously calculates whether or not signals from the two users PS1 and PS2 are separable by the adaptive array 2000. In response to the result of the calculation, the channel allocator 1040 supplies channel allocation information including user information for selecting frequencies and times to the adaptive array 2000. On the basis of the channel allocation information, the adaptive array 2000 weights the signals from the four antennas #1 to #4 in real time, thereby separating only a signal from a specific user.

[Structure for Transmission with Equal Power through Directivity of Adaptive Array]

Figure 2:
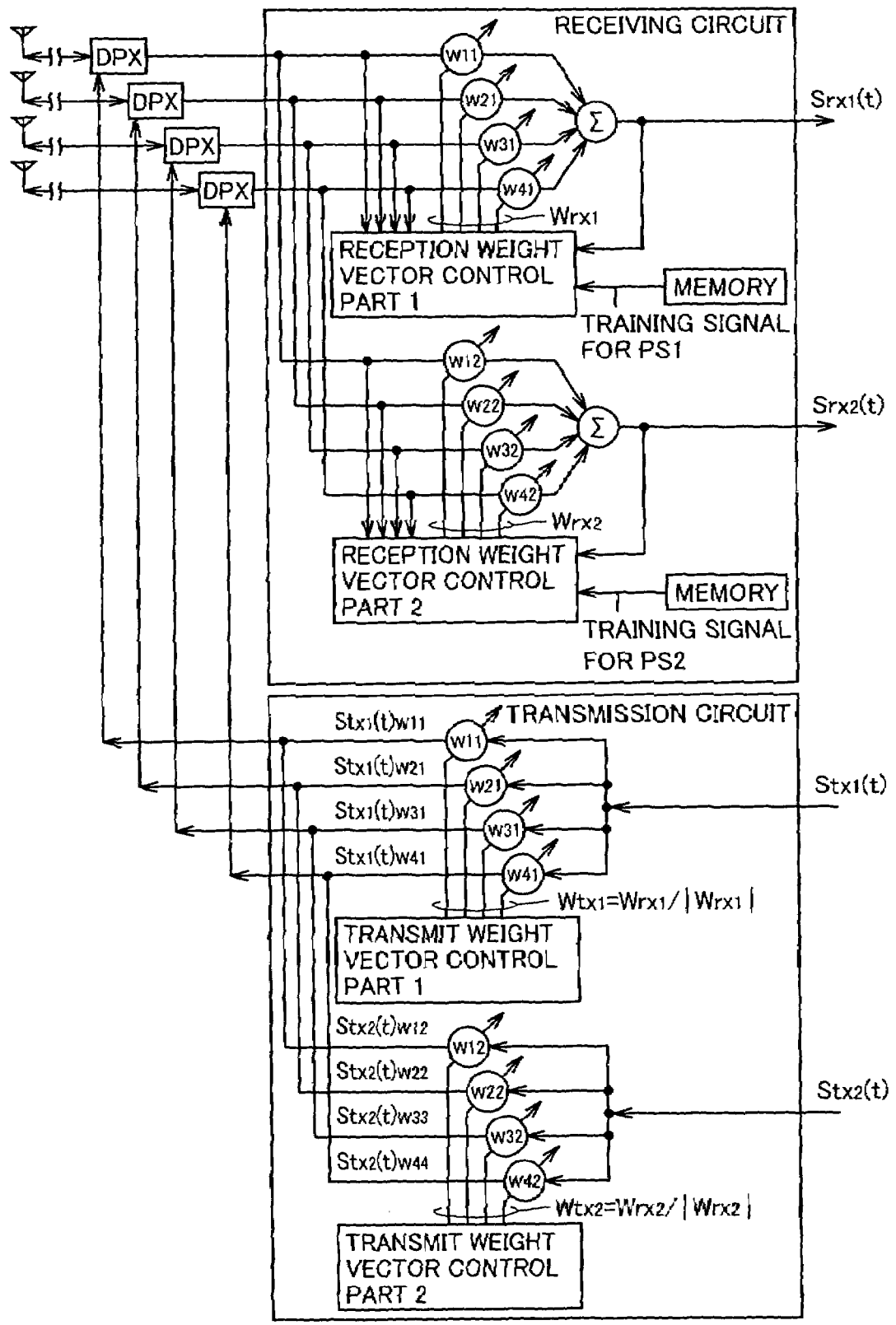
FIG. 2 is a schematic block diagram showing an exemplary structure of an adaptive array 2000 of FIG. 1.

FIG. 2 is a schematic block diagram showing a first structure of the adaptive array 2000 shown in FIG. 1.

Referring to FIG. 2, the structure of the conventional adaptive array 100 shown in FIG. 1 is simply provided in two systems in correspondence to the two users PS1 and PS2.

When performing spatial multiplex communication with the two users PS1 and PS2 through the same frequency and time slot, received signals $RX_j(t)$ in the four antennas #1 to #4 are expressed in the above equations (1) to (4).

In receiving, an adaptive array radio base station separates spatially multiplexed received signals through an adaptive array technique, as already described.

In this case, a weight vector $Wrx_1$ calculated in a receiving circuit of the base station for extracting a signal $Srx_1(t)$ transmitted from the user PS1 and a weight vector $Wrx_2$ for extracting a signal $Srx_2(t)$ transmitted from the user PS2 are expressed as follows:

$$Wrx_1 = [w_{11}, w_{21}, w_{31}, w_{41}]^T \quad (16)$$

$$Wrx_2 = [w_{12}, w_{22}, w_{32}, w_{42}]^T \quad (17)$$

where $w_{ik}$ represents an i-th weighting factor component of a weight vector for extracting a signal from a k-th terminal.

In transmission, weight vectors $Wtx_1$ and $Wtx_2$ are prepared by standardizing the weight vectors $Wrx_1$ and $Wrx_2$ in receiving as expressed below, for example, in order to form antenna directivity to transmit a transmit signal $Stx_1(t)$ for the user PS1 to the user PS1 and a transmit signal $Stx_2(t)$ for the user PS2 to the user PS2 respectively.

$$Wtx_1 = Wrx_1/(M|Wrx_1|) \quad (18)$$

$$Wtx_2 = Wrx_2/(M|Wrx_2|) \quad (19)$$

where M represents the number of spatial multiplex connection users. M=2 in the above example.

The weight vector $Wtx_1$ for transmitting the signal $Stx_1(t)$ only to the user PS1 is so controlled that the null point of directivity corresponds to the direction of the user PS2. Therefore, the weight vector $Wtx_1$ forms directivity emitting radio waves not in the direction of the user PS2 but in the direction of the user PS1 for the antennas #1 to #4.

Similarly, the weight vector $Wtx_2$ is employed for transmitting the signal $Stx_2(t)$ only to the user PS2. Therefore, it follows that antenna directivity is so formed as to transmit only the signal $Stx_1(t)$ to the user PS1 while transmitting only the signal $Stx_2(t)$ to the user PS2.

In this case, the magnitudes of the weight vectors $Wtx_1$ and $Wtx_2$ are standardized to 1/M and hence the signals $Stx_1(t)$ and $Stx_2(t)$ are transmitted to the users PS1 and PS2 with equal transmission power and the total transmission power from the base station is standardized to 1.

Figure 3:
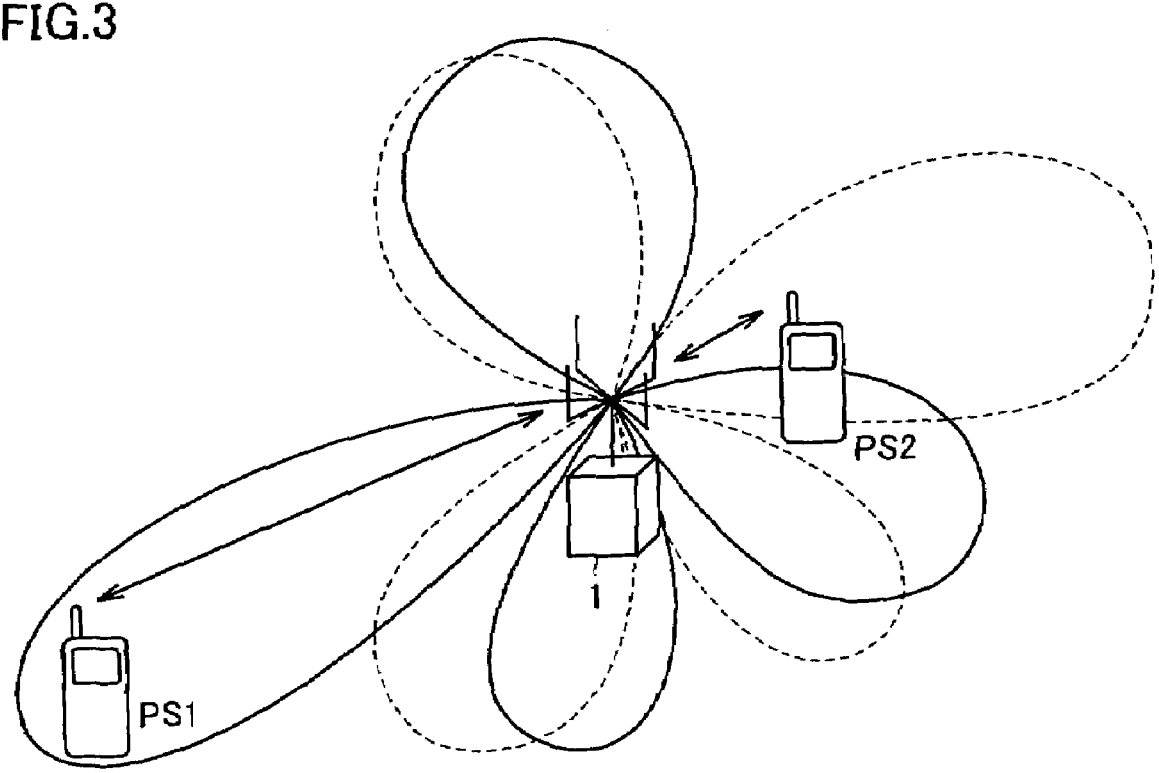
FIG. 3 is a diagram illustrating directivity and reachable distances of transmitted/received radio signals in the structure of the adaptive array 2000 shown in FIG. 2.

FIG. 3 illustrates radio signals transferred between a base station 1 and the two users PS1 and PS2 in a path-divided state in the structure of the adaptive array shown in FIG. 2. In the state shown in FIG. 3, the distance between the base station 1 and the second user PS2 is relatively shorter than that between the base station 1 and the first user PS1.

Also in this case, the base station 1 emits radio waves to the user PS2 with the same transmission power as that for the user PS1, as described above.

As hereinabove described, the antenna directivity for the user PS1 is so controlled that its null point corresponds to the direction for the user PS2. However, sometimes such directivity control of the user PS1 becomes difficult because of the fading as described above.

[Structure of Adaptive Array Antenna Controlling Transmission Power in Response to User]

Figure 4:
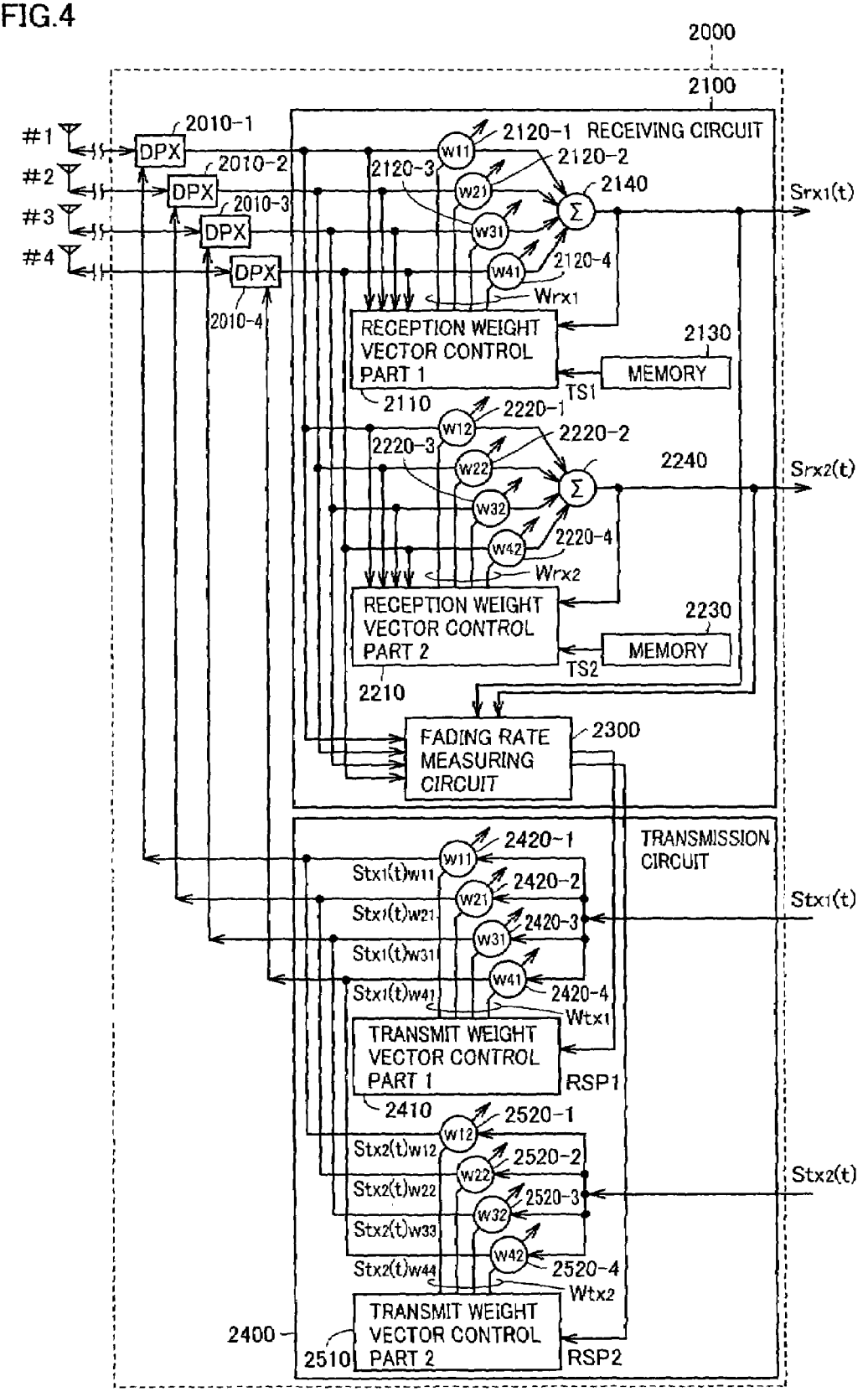
FIG. 4 is a schematic block diagram showing the structure of an adaptive array 2000 according to the first embodiment of the present invention.

FIG. 4 is a schematic block diagram showing the structure of an adaptive array 2000 according to the first embodiment of the present invention, which enables control of transmission directivity to a target user by controlling transmission power in accordance with the magnitude of fading rate that represents the degree of fading.

The adaptive array 2000 includes a receiving circuit 2100 for receiving signals from four antennas #1 to #4 and separating the signals into those received from users, a transmission circuit 2400 outputting a result of weighting a transmit signal $Stx_j(t)$ for each user to be transmittable to each user with directivity, and switching circuits 2010-1 to 2010-4 provided between the four antennas #1 to #4 and the receiving and transmission circuits 2100 and 2400 for switching connection paths between the antennas #1 to #4 and the receiving circuit 2100 or the transmission circuit 2400 in transmission and receiving respectively.

While FIG. 4 shows four antennas #1 to #4 for simplifying the illustration, the present invention is not restricted to this but more generally applicable to n (n: natural number) antennas.

In order to simplify the following description, it is assumed that two users PS1 and PS2 transmit/receive radio waves to/from the base station.

The receiving circuit 2100 includes a first reception weight vector control unit 2110 receiving outputs from the switching circuits 2010-1 to 2010-4, multipliers 2120-1 to 2120-4 outputting results obtained by multiplying the outputs from the corresponding switching circuits 2010-1 to 2010-4 by weighting factors in response to a weight vector $Wrx_1$ output from the reception weight vector control unit 2110 respectively, and an adder 2140 receiving the outputs from the multipliers 2120-1 to 2120-4 and outputting a result of addition thereof as a received signal $Srx_1(t)$ from the first user PS1.

The first reception weight vector control unit 2110 calculates weight vectors W11 to W41 through the signals received from the switching circuits 2110-1 to 2110-4 and a training signal corresponding to the signal from the user PS1 previously stored in a memory 2130 or the output from the adder 2140. A second reception weight vector control unit 2210, multipliers 2220-1 to 2220-4, a memory 2230 and an adder 2240 similar in structure to those corresponding to the first user PS1 are provided in correspondence to a signal $Srx_2(t)$ received from the second user PS2.

In order to separate the signal $Srx_2(t)$ received from the second user PS2, the receiving circuit 2100 is provided with a structure similar to that corresponding to the first user PS1.

The receiving circuit 2100 further includes a fading rate measuring circuit 2300 for receiving the outputs from the switching circuits 2010-1 to 2010-4 and measuring fading rate of respective users.

The transmission circuit 2400 includes a first transmit weight vector control unit 2410 receiving a transmit signal $Stx_1(t)$ output to the first user PS1 and calculating a transmit weight vector $Wtx_1$ on the basis of the value of a reception weight vector for the first user PS1 from the first reception weight vector control unit 2110 and received fading rate information for the first user PS1 from the fading rate measuring circuit 2300, and multipliers 2420-1 to 2420-4 receiving the transmit weight vector $Wtx_1$ output from the first transmit weight vector control unit 2410 respectively, multiplying the transmit signal $Stx_1(t)$ by weighting factors and outputting the results. The multipliers 2420-1 to 2420-4 output signals $Stx_1(t)w_{11}$, $Stx_1(t)w_{21}$, $Stx_1(t)w_{31}$ and $Stx_1(t)w_{41}$ respectively.

The transmission circuit 2400 further includes a second transmit weight vector control unit 2520 for generating a transmit signal $St_2(t)$ for the second user PS2 and multipliers 2520-1 to 2520-4, similarly to those for the first user PS1.

The second transmit weight vector control unit 2510 is supplied with fading rate information RSP2 for the second user PS2 from the fading rate measuring circuit 2300 and information of a received weight vector from the second received weight vector control unit 2210, to output a transmit weight vector $Wtx_2$ on the basis thereof.

Fading rate measuring circuit 2300 estimates fading rate that represents degree of fading of each user. As a method of estimating fading rate, a method of calculating a correlation value of reference signals included in received signals preceding and succeeding in time to estimate the fading rate, for example, has been conventionally proposed and disclosed, for example, in Japanese Patent Laying-Open No. 7-162360. The method of estimating fading rate of the present invention, however, is not limited to such a method, and various other methods may be used, including use of a response vector correlation value.

Figure 5:
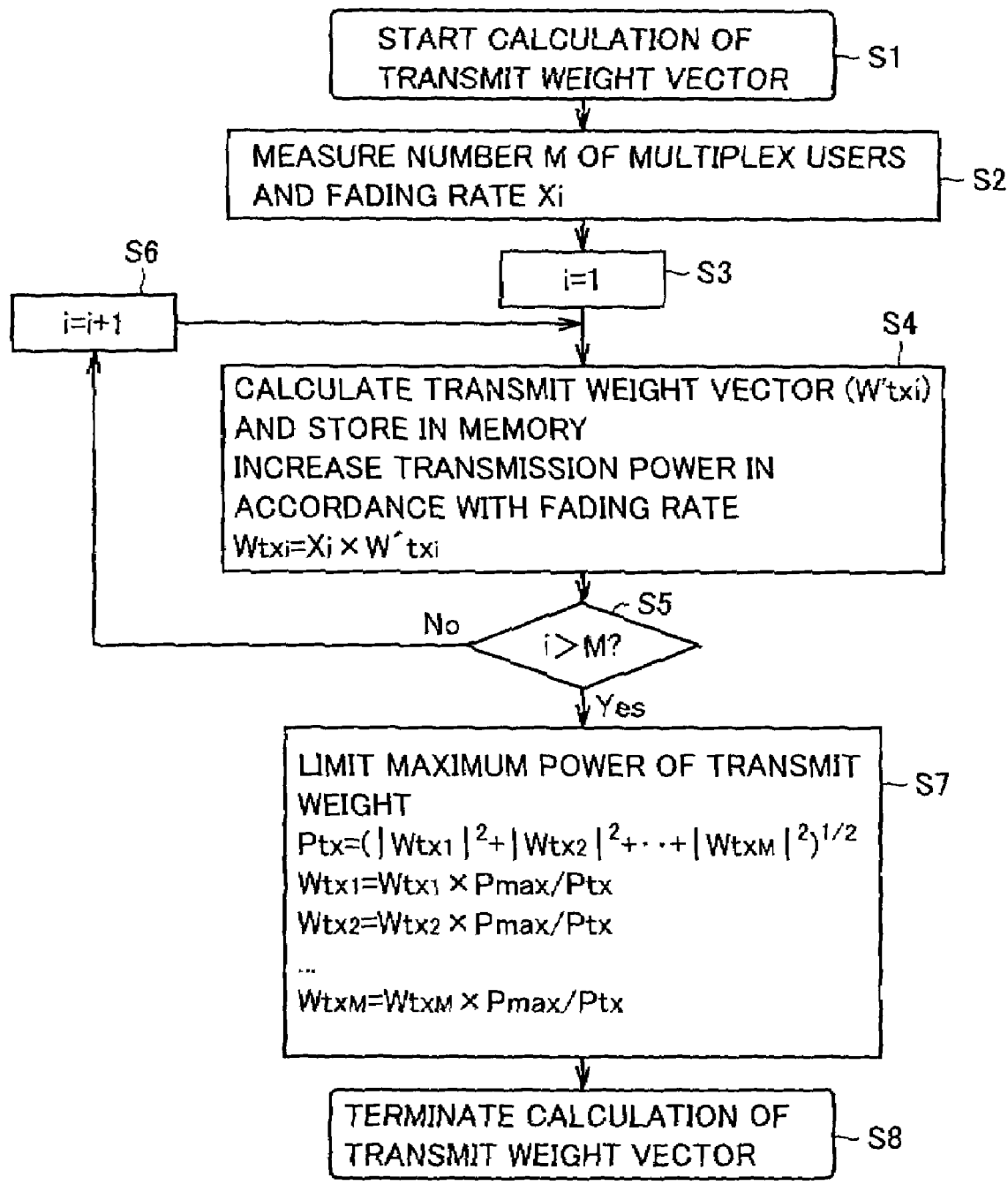
FIG. 5 is a flow chart illustrating a first method of controlling transmission directivity by the adaptive array 2000 in accordance with the first embodiment of the present invention.

FIG. 5 is a flow chart representing the first method of controlling transmission directivity by adaptive array 2000 in accordance with the first embodiment of the present invention represented by the functional block diagram of FIG. 4, when the method is executed by a software manner using a DSP1020 (FIG. 1).

According to the first control method, a factor that is in proportion to the fading rate measured for each user is multiplied by the corresponding transmit weight vector, so as to increase transmission power for a terminal of which fading rate is large.

Referring to FIG. 5, when calculation of the transmit weight vector starts in step S1, the fading rate measuring circuit 2300 measures the value of spatial multiplex connection users M, and measures the fading rate Xi of each user (step S2).

Thereafter, in step S3, the value of a parameter i for identifying the multiplex connection users is initialized to 1.

In step S4, the transmit weight vector W'tx$_i$ of the corresponding user i is calculated, temporarily stored in a memory, and a factor that is proportional to the measured fading rate Xi is multiplexed by the transmit weight vector Wtx$_i$. Accordingly, the transmission signal is multiplied by the transmit weight vector Wtx$_i$ that has been weighted in accordance with the fading rate, and thus the transmission power is adjusted in accordance with the fading rate.

Thereafter, in step S5, whether the value of parameter i exceeded the number M of the multiplex connection users or not is determined. When the value of parameter i does not exceed the number M of users, the value of parameter i is incremented by 1 in step S6, the process returns to step S4, and the process of step S4 is executed repeatedly until the value of parameter i exceeds the number M of users.

In step S5, when the value of parameter i exceeds the number M of users, the process proceeds to step S7.

In step S7, the transmit weight vector Wtx$_i$ (i=1, 2, 3 . . . , M) for each user is controlled such that transmission power to each user does not exceed the limit defined by statutory regulations. More specifically, the transmit weight vector Wtx$_i$ of each user is multiplied by Pmax/Ptx, where Ptx represents a square root of square sum of an absolute value of transmit weight vector of each user and Pmax represents a maximum value of transmission power, so as to limit the maximum value of the transmit weight vector.

In step S8, calculation of the transmit weight vector ends.

Figure 6:
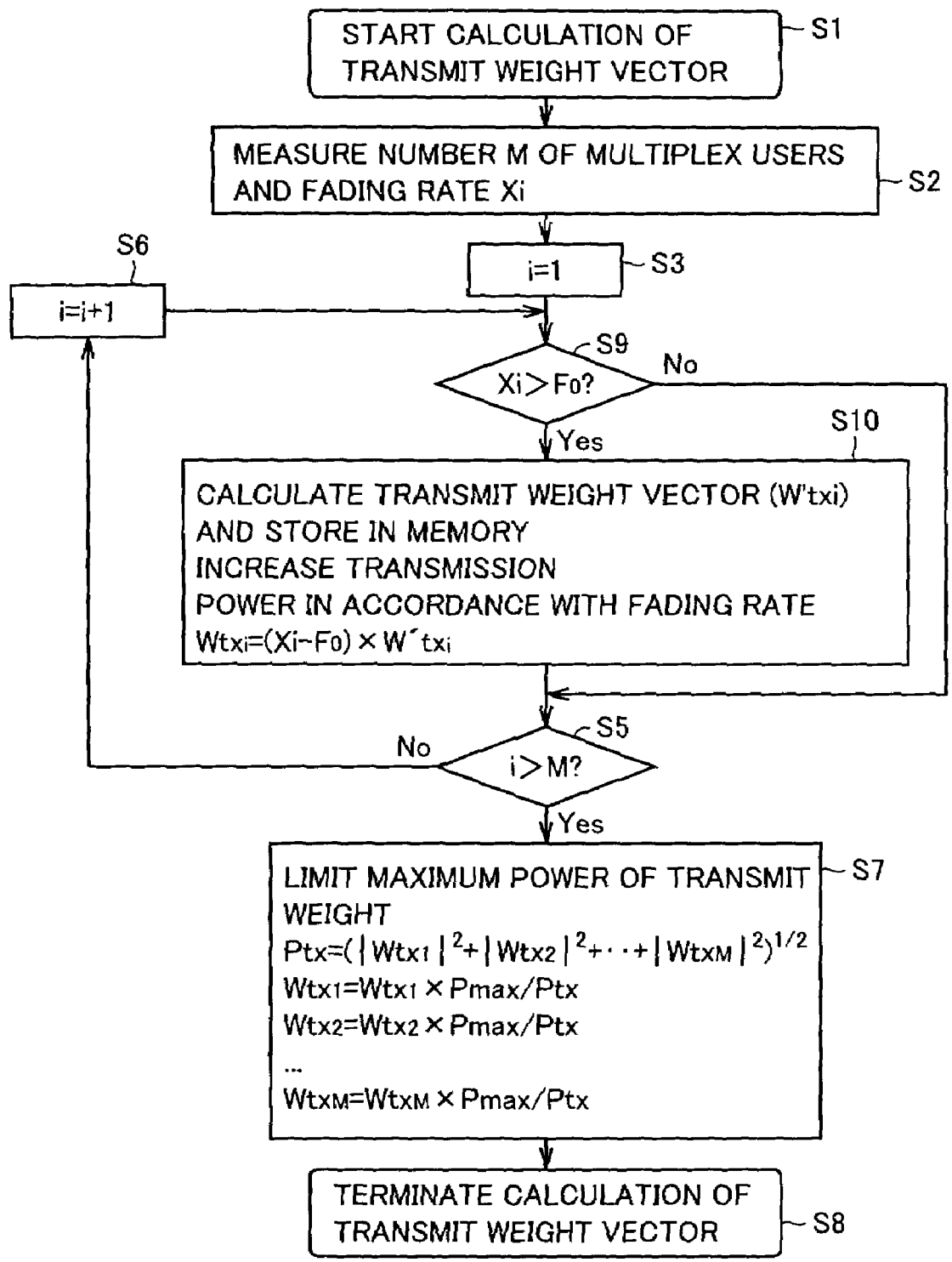
FIG. 6 is a flow chart illustrating a second method of controlling transmission directivity by the adaptive array 2000 in accordance with the first embodiment of the present invention.

FIG. 6 is a flow chart representing the second method of controlling transmission directivity by the adaptive array 2000 in accordance with the first embodiment of the present invention represented by the functional block diagram of FIG. 4, when the method is executed by a software manner using DSP1020 (FIG. 1).

In the second control method, the transmit weight vector is multiplexed by the corresponding factor in proportion to (Xi–F$_0$) only for that terminal of which measured fading rate Xi for the user exceeds a prescribed fading rate F$_0$, and weighting of the transmit weight vector is not performed for other terminals. Therefore, the transmission power is increased for a terminal of which fading rate is large.

The flow chart of FIG. 6 differs from the flow chart of FIG. 5 only in the following points, and description of common processes will not be repeated. Namely, in place of step S4 of FIG. 5, the processes of steps S9 and S10 are performed in the flow of FIG. 6.

In step S9, whether the fading rate Xi measured for each of the multiplex connection users exceeds a prescribed fading rate F$_0$ or not is determined. The process of step S10 is executed only for that user of which measured rate is determined to be higher than the prescribed fading rate F$_0$.

In step S10, the transmit weight vector W'tx$_i$ of the corresponding user i is calculated, temporarily stored in the memory, and in accordance with the measured fading rate Xi, the transmit weight vector W'tx$_i$ is multiplied by a factor that is in proportion to (Xi–F$_0$). Accordingly, only for that terminal of which fading rate exceeds a prescribed magnitude, the transmission signal is multiplied by the transmit weight vector Wtx$_i$ weighted in accordance with the fading rate, and the transmission power is adjusted in accordance with the fading rate.

FIG. 7 is a flow chart representing the third method of controlling transmission directivity by the adaptive array 2000 in accordance with the first embodiment of the present invention represented by the functional block diagram of FIG. 4, when the method is executed by a software manner using DSP1020 (FIG. 1).

In the third control method, a factor determined in accordance with the fading rate Xi measured for each user is selected from a table including a plurality of factors set in advance in accordance with prescribed ranges of the fading rate, and the corresponding transmit weight vector is multiplexed by the determined factor, so as to increase transmission power for the terminal of which fading rate is large.

The flow chart of FIG. 6 differs from the flow chart of FIG. 5 only in the following points, and description of common processes will not be repeated. Namely, in place of step S4 of FIG. 5, the process of step S11 is performed in the flow of FIG. 6.

In step S11, the transmit weight vector W'tx$_i$ of the corresponding user i is calculated and temporarily stored in the memory. In accordance with the measured fading rate Xi, a corresponding power up factor is determined from a table set in advance, such as shown in FIG. 8, and multiplied by the transmit weight vector W'tx$_i$. Thus, the transmission signal is multiplied by the transmit weight vector Wtx$_i$ weighted in accordance with the fading rate, and the transmission power is adjusted in accordance with the fading rate.

Figure 9:
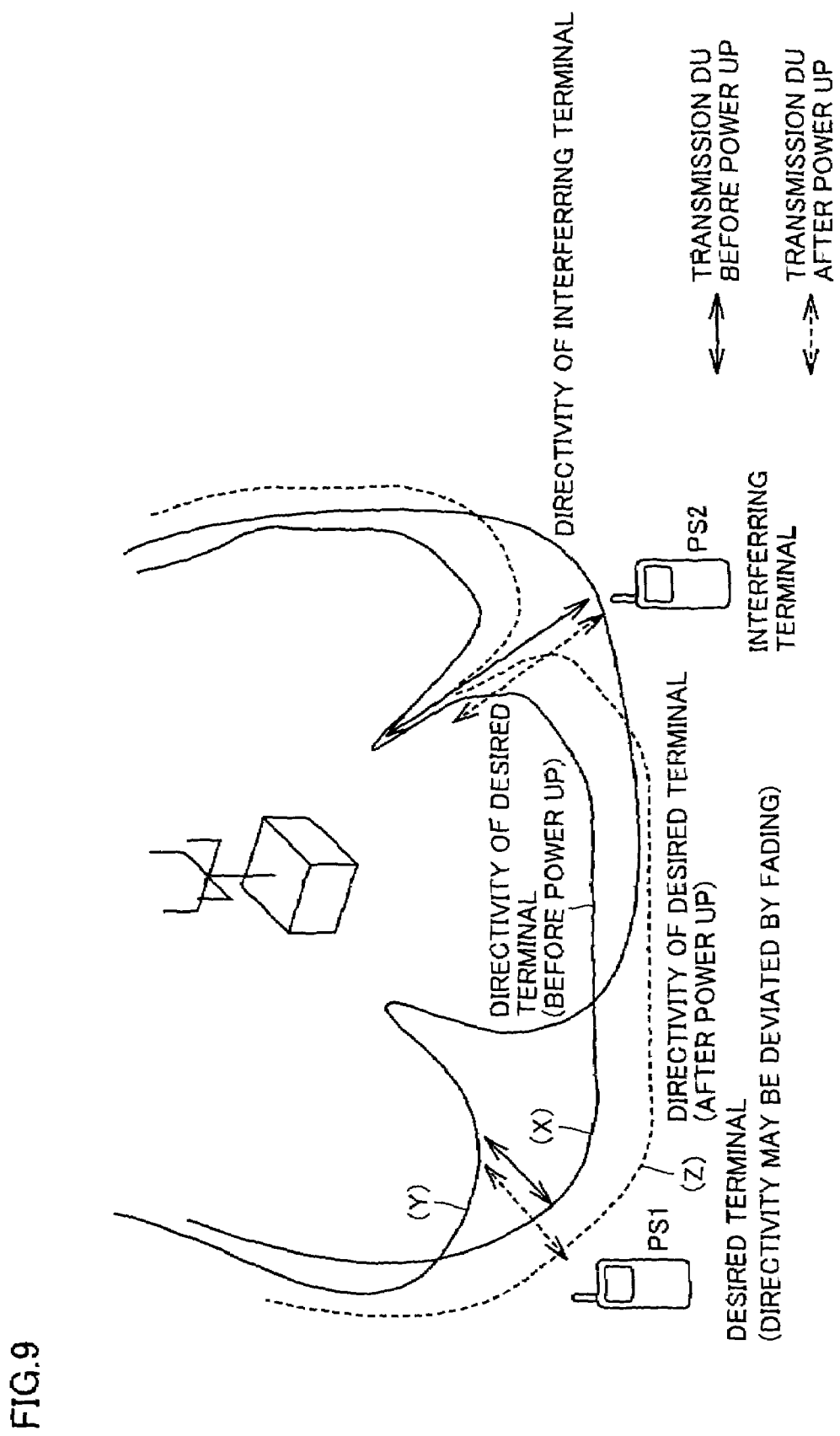
FIG. 9 is a schematic illustration representing directivity and reachable distances of transmit radio waves in the case of performing the processing shown in FIGS. 5–7.

FIG. 9 schematically represents the effects attained by the method of controlling transmission directivity in accordance with the first embodiment. Referring to FIG. 9, the desired terminal PS1 is out of the original range of directivity (the range represented by the solid line (X)) of the transmission radiowaves for PS1 because of fading caused by rapid movement, for example. Therefore, it is necessary to enlarge the range of directivity (two sided arrows in the dotted line) represented by the dotted line (Z), by increasing the difference (two sided arrows in the solid line) from the range of directivity (range represented by the solid line (Y)) of the transmission radiowaves for the interfering terminal PS2.

According to the first embodiment of the present invention, the transmission power for a desired terminal is increased (within the range of statutory regulations) in accordance with the fading rate that represents the degree of fading, and directivity that is once lost for the desired terminal can be recovered.

Figure 10:
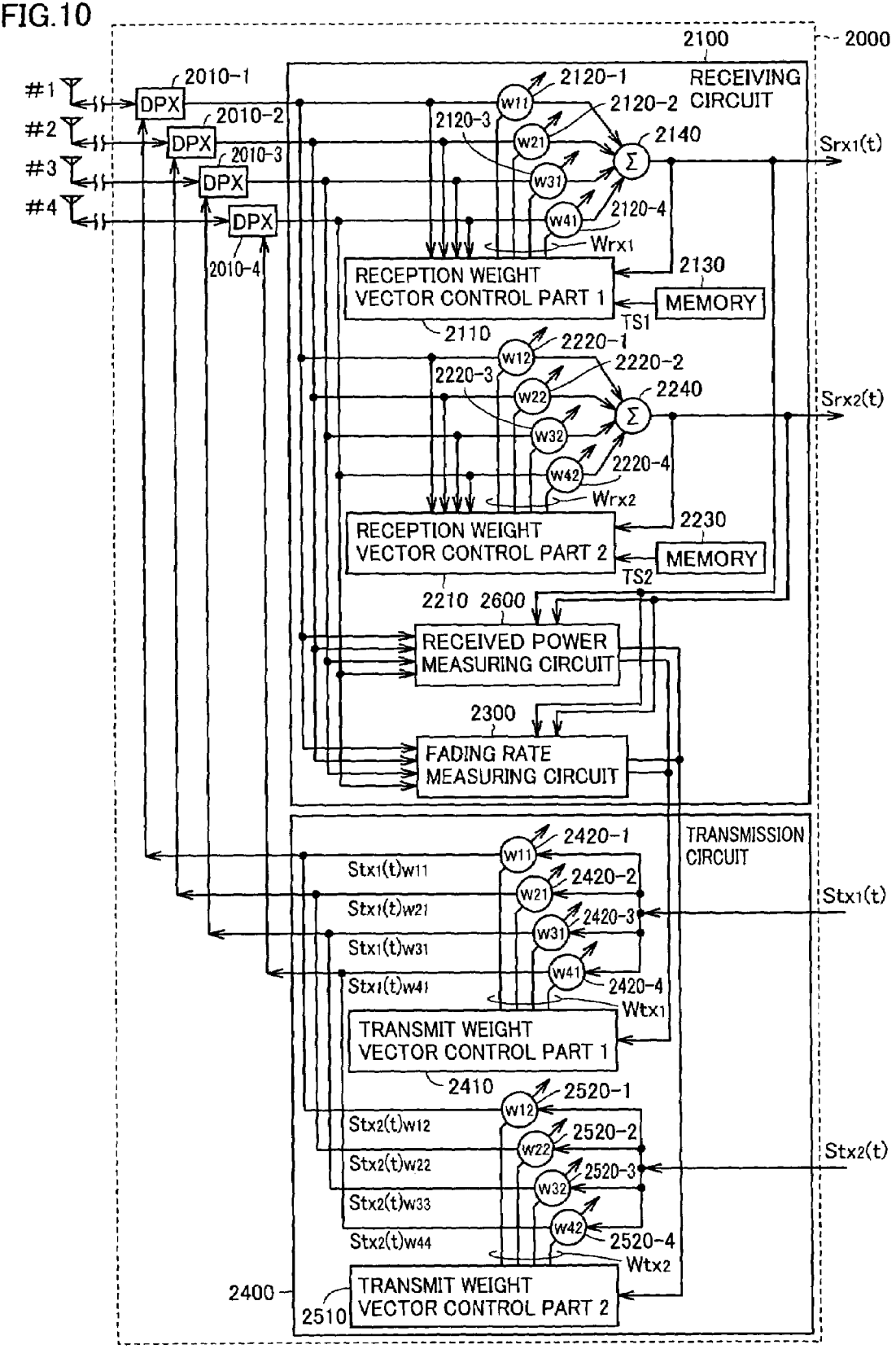
FIG. 10 is a schematic block diagram showing a structure of an adaptive array in accordance with the second embodiment of the present invention.

FIG. 10 is a schematic block diagram representing a structure of the adaptive array 2000 of a radio apparatus in accordance with the second embodiment, which is capable of controlling transmission directivity to a target user, by controlling transmission power in accordance with the magnitude of receiving power, in addition to the magnitude of fading rate representing the degree of fading.

The adaptive array shown in FIG. 10 is the same as the adaptive array shown in FIG. 4 except for the following point. Namely, in parallel with fading rate measuring circuit 2300, a received power measuring circuit 2600 is provided, that receives outputs from switching circuits 2010-1 to 2010-4 and measures a received power value of the radio-wave signal which is being received.

The first transmit weight vector control unit 2410 receives a transmission signal $Stx_1$ (t) output to the first user PS1, and calculates the transmit weight vector, based on the value of the reception weight vector for the first user PS1 from the first reception weight vector control unit 2110, fading rate information for the first user PS1 from the fading rate measuring circuit 2300 and the received power information from the received power measuring circuit 2600.

To the second transmit weight vector control unit 2510, the fading rate information for the second user PS2 from fading rate measuring circuit 2300, the received power information from the received power measuring circuit 2600 and the reception weight vector information from the second reception weight vector control unit 2210 are applied, and based on these, the second transmit weight vector control unit 2510 outputs the transmit weight vector $Wtx_2$.

A method of controlling transmission power (transmission directivity) by measuring the received power only has been known and disclosed, for example, in Japanese Patent Laying-Open No. 2000-106539.

Operations of the received power measuring circuit 2600 shown in FIG. 10 are now described.

Assuming that the number of antennas is four and the number of users simultaneously making communication is two, signals output from the receiving circuit through the antennas are expressed in the above equations (1) to (4).

As described above, the received signals in the antennas expressed in the equations (1) to (4) are expressed in vector forms as follows:

$$X(t) = H_1 Srx_1(t) + H_2 Srx_2(t) + N(t) \quad (5)$$

$$X(t) = [RX_1(t), RX_2(t), \ldots, RX_n(t)]^T \quad (6)$$

$$H_i = [h_{1i}, h_{2i}, \ldots, h_{ni}]^T, (i=1, 2) \quad (7)$$

$$N(t) = [n_1(t), n_2(t), \ldots, n_n(t)]^T \quad (8)$$

When operating in an excellent state, the adaptive array 2000 separates/extracts the signals from the users PS1 and PS2 and hence all signals $Srx_i(t)$ (i=1, 2) have known values.

Through the known signals $Srx_i(t)$, received signal vectors $H_1 = [h_{11}, h_{21}, h_{31}, h_{41}]$ and $H_2 = [h_{12}, h_{22}, h_{32}, h_{42}]$ can be derived as described below.

The received signal is multiplied by the known user signal, e.g., the signal $Srx_1(t)$ from the first user PS1, to calculate an ensemble mean (time average) as follows:

$$E[X(t) \cdot Srx_1(t)] = H_1 \cdot E[Srx_1(t) \cdot Srx_1(t)] + \quad (20)$$
$$H_2 \cdot E[Srx_2(t) \cdot Srx_1(t)] + E[N(t) \cdot Srx_1(t)]$$

where E[ . . . ] represents the time average. If the averaging time is sufficiently long, the mean values are as follows:

$$E[Srx_1(t) \cdot Srx_2(t)] = 1 \quad (21)$$

$$E[Srx_2(t) \cdot Srx_1(t)] = 0 \quad (22)$$

$$E[N(t) \cdot Srx_1(t)] = 0 \quad (23)$$

The value of the equation (22) is zero since the signals $Srx_1(t)$ and $Srx_2(t)$ have no correlation. The value of the equation (23) is zero since the signal $Srx_1(t)$ and a noise signal N(t) have no correlation.

Therefore, the ensemble mean of the equation (20) is consequently equal to the received signal factor vector $H_1$ as follows:

$$E[X(t) \cdot Srx_1(t)] = H_1 \quad (24)$$

The received signal factor vector $H_1$ of the signal transmitted from the first user PS1 can be measured through the aforementioned procedure.

A received signal factor vector $H_2$ of the signal transmitted from the second user PS2 can be measured by calculating an ensemble mean of the input signal vector X(t) and the signal $Srx_2(t)$ in a similar manner to the above.

Figure 11:
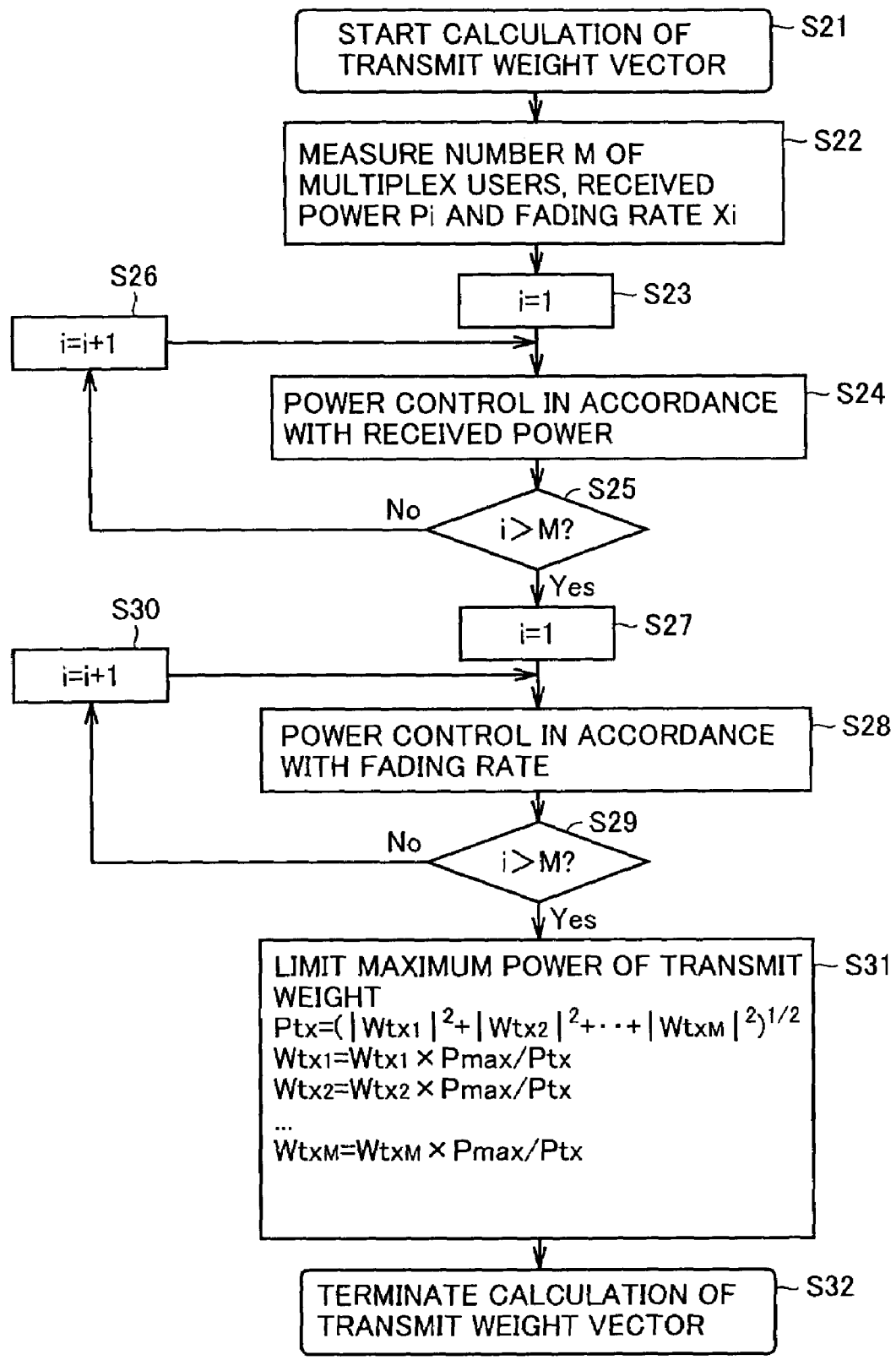
FIG. 11 is a flow chart illustrating a method of controlling transmission directivity by the adaptive array 2000 in accordance with the second embodiment of the present invention.

FIG. 11 is a flow chart representing the method of controlling transmission directivity by the adaptive array 2000 in accordance with the second embodiment of the present invention represented by the functional block diagram of FIG. 10, when the method is executed by a software manner using DSP1020 (FIG. 1).

According to the control method, the factor in accordance with the fading rate measured for each user is multiplied by the corresponding transmit weight vector and, in parallel, a factor in accordance with the received power measured for each user is multiplied by the corresponding transmit weight vector, so as to adjust transmission power for the terminal in accordance with the magnitude of the fading rate and the magnitude of the received power.

Referring to FIG. 11, when calculation of the transmit weight vector starts in step S21, the fading rate measuring circuit 2300 and the received power measuring circuit 2600 measure the value of the number of users M of spatial multiplex connection, and measure the fading rate Xi and received power Pi of each user (step S22).

Thereafter, in step S23, the value of parameter i for identifying the multiple connection user is initialized to 1.

In step S24, the transmission power is adjusted in accordance with the received power, as will be discussed later.

Thereafter, in step S25, whether the value of parameter i exceeds the number M of users of multiple connection or not is determined. When the value of parameter i does not exceed the number M of users, the value of parameter i is incremented by 1 in step S26, the process returns to step S24, and the process of step S24 is executed repeatedly until the value of parameter i exceeds the number M of users.

In step S25, when the value of parameter i exceeds the user number M, the process proceeds to S27.

Thereafter, in step S27, the value of parameter i for identifying the multiplex connection users is initialized to 1.

In step S28, the transmission power is adjusted in accordance with the fading rate mentioned above. More specifically, in step S28, either one of the first control method (step S4 of FIG. 5), the second control method (steps S9 and S10 of FIG. 6) and the third control method (step S11 of FIG. 7) described with reference to FIGS. 5 to 8 is executed. Detailed description thereof will not be repeated.

Thereafter, in step S29, whether the value of parameter i exceeds the number M of multiplex connection users or not is determined. When the value of parameter i does not exceed the number M of users, the value of parameter i is incremented by 1 in step S34, the process returns to step S84, and the process of step S28 is executed repeatedly until the value of parameter i exceeds the number M of users.

In step S29, when the value i exceeds the number M of users, the process proceeds to step S31.

Step S31 is the same as the step S7 of FIGS. 5 to 7, and the transmit weight vector Wtx$_i$(i=1, 2, . . . , M) for each user is controlled such that transmission power to each user does not exceed the limit defined by statutory regulations.

In step S8, calculation of the transmit weight vector ends.

Figure 12:
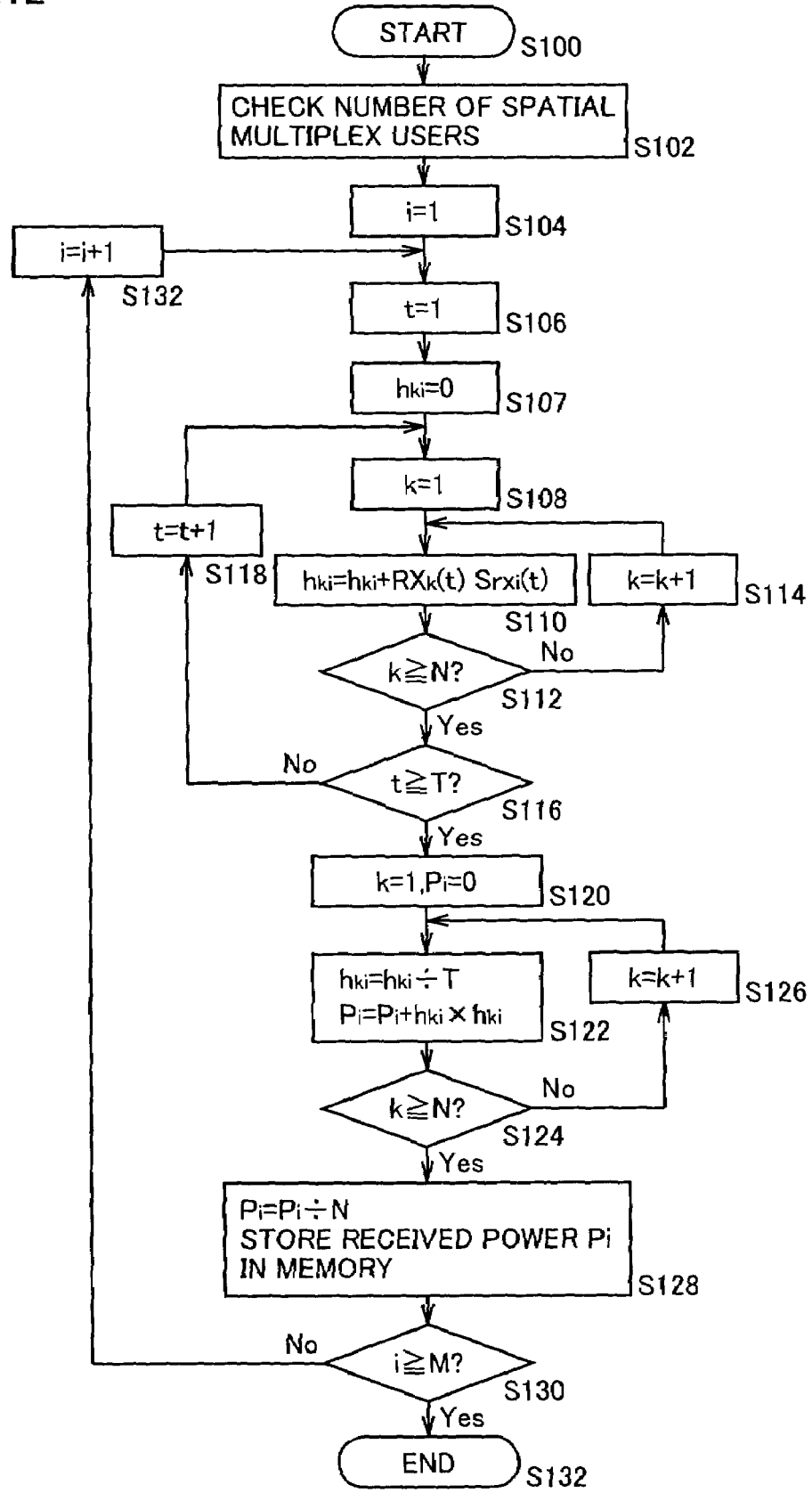
FIG. 12 a flow chart illustrating operations of a received power measuring circuit 2600.

FIG. 12 is a flow chart representing the transmission directivity control of the second embodiment described with reference to FIGS. 10 and 11, extracting the procedure for drawing the received power Pi from each user, which corresponds to the processes of steps S21 and S22 of FIG. 11.

When measurement of the received power $P_i$ is started (step S100), the received power measuring circuit 2600 first confirms the number M of spatial multiplex users (step S102).

Then, the received power measuring circuit 2600 initializes the value of a parameter i for identifying each spatial multiplex connection user to 1 (step S104).

Then, the value of a parameter t expressing a receiving time is initialized to 1 (step S106).

Then, a value $h_{ki}$ of a received signal factor vector for an i-th user for a k-th antenna is initialized to zero (step S107), and the value of a parameter k for identifying the antenna is initialized to 1 (step S108).

Then, the received power measuring circuit 2600 updates the value $h_{ki}$ of the received signal factor vector by adding the value of the product of a received signal RX$_k$(t) received by the k-th antenna at the time t and the i-th user signal Srx$_i$(t) to the value $h_{ki}$ in a stage preceding the time t (step S110).

Then, a determination is made as to whether or not the value of the parameter k is equal to or greater than the number N of the antenna elements (step S112), and if the processing is not completed in correspondence to the number of the antenna elements, the value of the parameter k is incremented by 1 (step S114) for repeating the processing at the step S110.

If the value of the parameter k is equal to the number N of the antenna elements, a determination is made as to whether or not the value of the parameter t expressing the time is equal to or greater than a mean time T (step S116). If the value of the parameter t is less than the mean time T, the value of the parameter t is incremented by 1 and the processing returns to the step S108.

The mean time T, expressing the length of a signal series decided in the communication system, for example, corresponds to 120 symbols in a PHS system, for example.

If the value of the parameter t is equal to or greater than the mean time T (step S116), the value of the parameter k is initialized to 1 again and the value of the received signal power $P_i$ for the i-th user is initialized to zero (step S120).

Then, the value $h_{ki}$ of the received signal factor vector operated between the steps S108 and S116 is replaced with a value averaged by dividing the accumulated value $h_{ki}$ by the mean time T, and the value of the received signal power $P_i$ is updated to a value obtained by adding the square of the value $h_{ki}$ of the received signal vector to the received signal power $P_i$ (step S122).

Then, a determination is made as to whether or not the value of the parameter k is equal to or greater than the number N of the antenna elements (step S124), and if the value of the parameter k is less than the number N of the antenna elements, the value of the parameter k is incremented by 1 (step S126) and the processing returns to the step S122.

If the value of the parameter k is determined as exceeding the number N of the antenna elements (step S124), a value obtained by dividing the value of the received signal power $P_i$ by the number N of the antenna elements is newly stored in a memory as the received power $P_i$ (step S128).

Then, a determination is made as to whether or not the value of the parameter i is equal to or greater than the number M of the spatial multiplex users, and if the value of the parameter i is less than the number M of the users (step S130), the value of the parameter i is incremented by 1 (step S132) and the processing returns to the step S106.

If the value of the parameter i is equal to or greater than the number M of the users (step S130), the processing is terminated (step S134).

The received power $P_i$ for the i-th user can be measured on the basis of the value $H_i$ of the received signal factor vector for each user through the aforementioned processing.

The received signal power $P_i$ for each user obtained in the aforementioned manner is expressed as follows:

$$P_1 = H_1^2/n = (h_{11}^2 + h_{21}^2 + h_{31}^2 + h_{41}^2)/n \quad (25)$$

$$P_2 = H_2^2/n = (h_{12}^2 + h_{22}^2 + h_{32}^2 + h_{42}^2)/n \quad (26)$$

On the basis of the received signal power $P_i$ obtained in the received power measuring circuit 2600 in the aforementioned manner in step S24 of FIG. 11, the transmit weight vector control units 2410 and 2510 derive the transmit weight vectors Wtx$_i$(i=1, 2) corresponding to the users PS1 and PS2 as follows:

$$Wtx_1 = (P_1 Wrx_1)/(|Wrx_1|(P_1+P_2)) \quad (27)$$

$$Wtx_2 = (P_2 Wrx_1)/(|Wrx_1|(P_1+P_2)) \quad (28)$$

Each of the weight vectors Wtx$_1$ and Wtx$_2$ derived through the above equations (27) and (28) has directivity of emitting radio waves only to the direction of the corresponding user and not to the direction of users other than the corresponding user.

When employing the aforementioned weight vectors Wtx$_1$ and Wtx$_2$, the received power P2 of the user PS2 is greater than the received power P1 of the user PS1. Transmission power is in proportionate to the value of the weight vector and hence the transmission power to the user PS1 is greater than that to the user PS2. The total transmission power from the base station 1 is standardized to 1 similarly to the prior art, and hence the transmission power to the terminal (user PS1) far from the base station 1 is increased while that to the terminal (user PS2) close to the base station 1 is suppressed.

While the number of the antennas is four and the number of the users is two in the above description, the present invention is not restricted to this but more generally applicable to n antennas and M spatial multiplex connection terminals.

In this case, received power $P_i$ for an i-th terminal is expressed as follows:

$$P_i = H_i^2/n = (h_{1i}^2 + h_{2i}^2 + \cdots + h_{ni}^2)/n \quad (29)$$

The transmit weight vector $Wtx_i$ is expressed as follows:

$$Wtx_i = ((P_1 + \cdots + P_{i-1} + P_{i+1} + \cdots + P_M)Wrx_i) / \qquad (30)$$
$$(|Wrx_i|(M-1) \cdot (P_1 + P_2 + \cdots + P_M))$$

Figure 13:
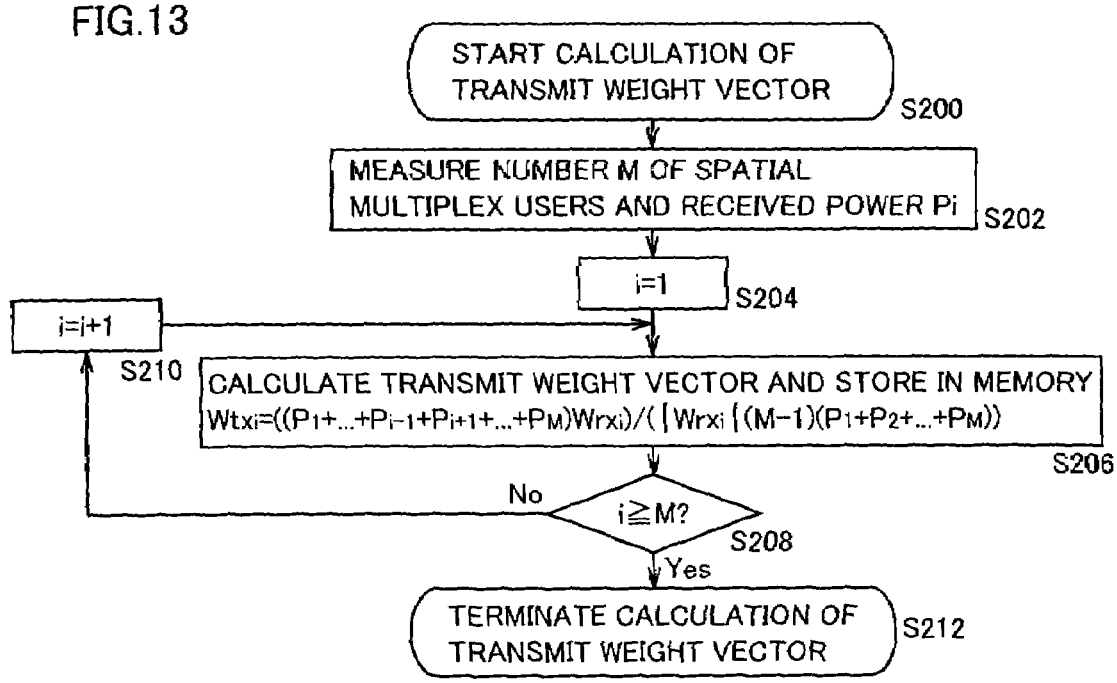
FIG. 13 is a flow chart illustrating operations of transmit weight vector control units 2410 and 2510.

FIG. 13 is a flow chart showing the flow of processing for deriving each transmit weight vector in the aforementioned procedure. More specifically, it extracts and represents the process of drawing out the transmit weight vector based on the measured received power Pi in the transmission directivity control of the second embodiment described with reference to FIGS. 10 and 11, which corresponds to the process of steps S21–S26 of FIG. 11.

When calculation of the transmit weight vector is started (step S200), the transmit weight vector control unit 2410 receives the results of measurement of the number M of the spatial multiplex users and the received power $P_i$ thereof from the received power measuring circuit 2600 (step S202).

Then, the value of the parameter i for identifying each user is initialized to 1 (step S204). Then, the transmit weight vector control unit 2410 calculates the transmit weight vector in accordance with the equation (30) and stores the same in a memory (step S206).

Then, a determination is made as to whether or not the value of the parameter i is equal to or greater than the number M of the spatial multiplex users. If the value of the parameter i is less than the number M of the spatial multiplex users (step S208), the value of the parameter i is incremented by 1 (step S210) and the processing returns to the step S206.

If the value of the parameter i is equal to or greater than the number M of the spatial multiplex users (step S208), calculation of the transmit weight vector is terminated (step S212).

A transmit radio signal having directivity to a specific user is generated through the transmit weight vector calculated in the aforementioned manner.

Figure 14:
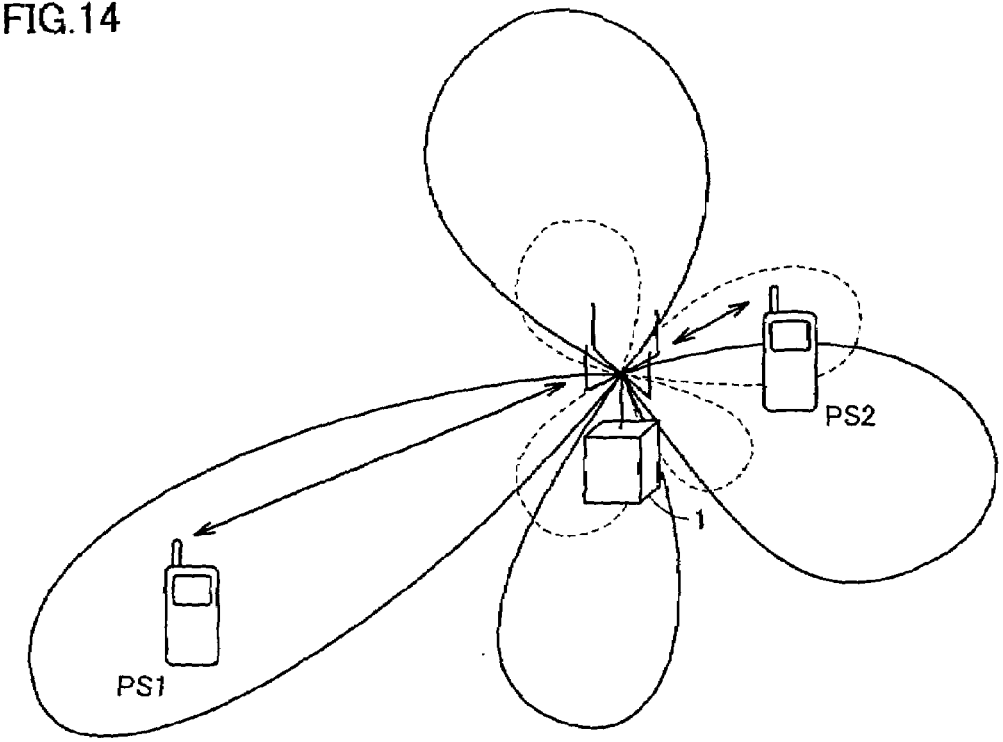
FIG. 14 is a schematic block diagram illustrating directivity and reachable distances of transmit radio waves in the case of performing the processing shown in FIG. 13.

FIG. 14 illustrates directivity and reachable ranges of radio signals transmitted from the base station 1 to the users PS1 and PS2 on the basis of the transmit weight vectors derived in the aforementioned manner in contrast with FIG. 3.

The transmit weight vectors are controlled in response to the distances between the receiving terminals and the base station 1, i.e., in response to the values of the received power, and hence transmission power is suppressed to reduce undesired interference to another cell if the terminal is close to the base station 1 while transmission power to a separate terminal, for example a terminal to which directivity is deviated because of fading, is increased to increase the maximum reachable distance in an established manner.

The received power measuring circuit 2600 may also have the following structure.

When newly establishing a central channel with a user in a PHS system, for example, a base station CS first performs a carrier sense operation (operation of measuring D/U (signal power-to-interference power ratio) of all communication channels) and specifies a channel having the ratio D/U exceeding a certain constant value or the best ratio D/U as a communication channel for a terminal PS. Then, the terminal PS measures the ratio D/U of the channel specified by the base station CS and starts communication through the specified channel if the ratio D/U exceeds a prescribed value.

Received power is measured also when such a carrier sense operation is performed, and hence the received power measuring circuit 2600 shown in FIG. 10 can also be employed in this case.

The radio apparatus capable of transmission directivity control in accordance with the second embodiment can also calculate the transmit weight vector by the following method. A received signal factor $H_i$ of each user $PS_i$ included in a received signal is first measured. Then, each signal power $P_i$ is obtained from the measured received signal factor vector $H_i$ in accordance with the equation (29) for the first embodiment.

Then, a transmit weight vector $Wtx_i$ corresponding to each user is calculated as follows:

$$Wtx_i = \left(\left(P_1^{\frac{1}{2}} + \cdots + P_{i-1}^{\frac{1}{2}} + P_{i+1}^{\frac{1}{2}} + \cdots + P_M^{\frac{1}{2}}\right)Wrx_i\right) / \qquad (31)$$
$$\left(|Wrx_i|(M-1) \cdot \left(P_1^{\frac{1}{2}} + P_2^{\frac{1}{2}} + \cdots + P_M^{\frac{1}{2}}\right)\right)$$

The weight vector $Wtx_i$ forms directivity emitting radio waves not to the direction of an undesirable user $PS_j$ but to the direction of a desirable user $PS_i$.

Figure 15:
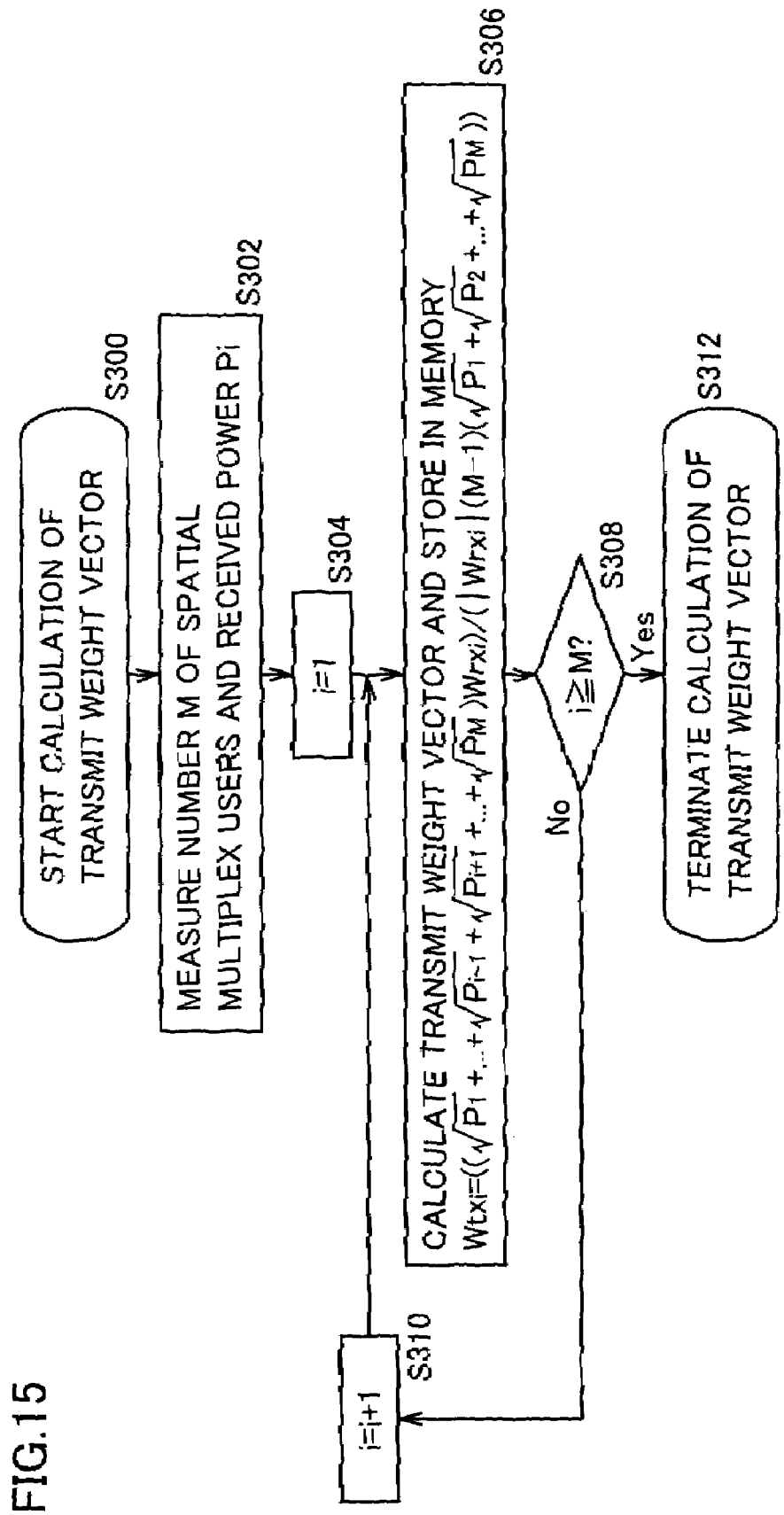
FIG. 15 is a flow chart illustrating operations of a transmit weight vector control unit in accordance with the second embodiment of the present invention.

FIG. 15 is a flow chart showing the flow of processing for obtaining the transmit weight vector $Wtx_i$ in accordance with such a procedure, which corresponds to steps S21–S26 of FIG. 11.

The flow chart shown in FIG. 15 is basically similar to that shown in FIG. 6 except that the calculation formula (31) for the transmit weight vector $Wtx_i$ at a step S306 substitutes for the calculation formula (30) for the transmit weight vector $Wtx_i$ at the step S206 in the flow chart shown in FIG. 13, and hence redundant description is not repeated.

According to the method of FIG. 15, again, the transmit weight vector $Wtx_i$ is controlled in response to the distance between a receiving terminal and a base station 1, i.e., in response to the value of the received power. Thus, transmission power is suppressed to reduce undesired interference to another cell if the terminal is close to the base station 1 while transmission power to a terminal far from the base station 1 is increased to increase the maximum reachable distance in an established manner.

The radio apparatus capable of transmission directivity control in accordance with the second embodiment can also calculate the transmit weight vector by the following method. A received signal factor $H_i$ of each user $PS_i$ included in a received signal is first measured. Then, each signal power $P_i$ is obtained from the measured received signal factor vector $H_i$ in accordance with the equation (29).

In the radio apparatus, the maximum value $P_{max}$ of transmission power for each terminal is previously defined. A transmit weight vector $Wtx_i$ corresponding to each user $PS_i$ (i=1, 2, . . . , M) is calculated as follows:

i) If the value of $P_i$ is equal to or greater than $P_{max}$:

$$Wtx_i = (Pmax Wrx_i)/(P_i M|Wrx_i|) \qquad (32)$$

ii) If the value of $P_i$ is less than $P_{max}$:

$$Wtx_i = (Pmax Wrx_i)/(M|Wrx_i|) \qquad (33)$$

When deriving the transmit weight vector $Wtx_i$ in the aforementioned manner, transmission power to a terminal close to a base station is regularly suppressed and hence excessive interference to another cell can be reduced.

Figure 16:
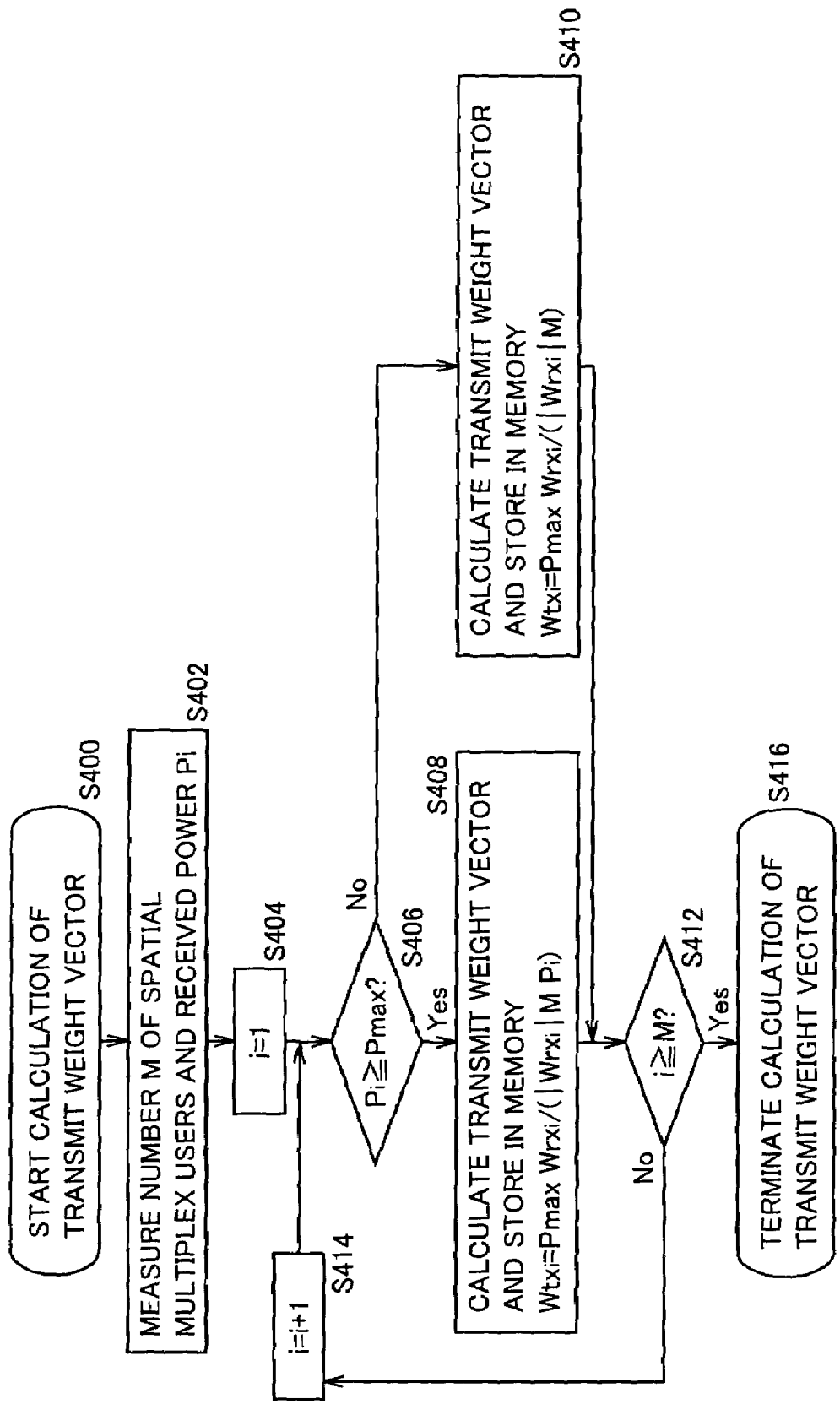
FIG. 16 is a flow chart illustrating another operation of a transmit weight vector control unit in accordance with the second embodiment of the present invention.
Figure 17:
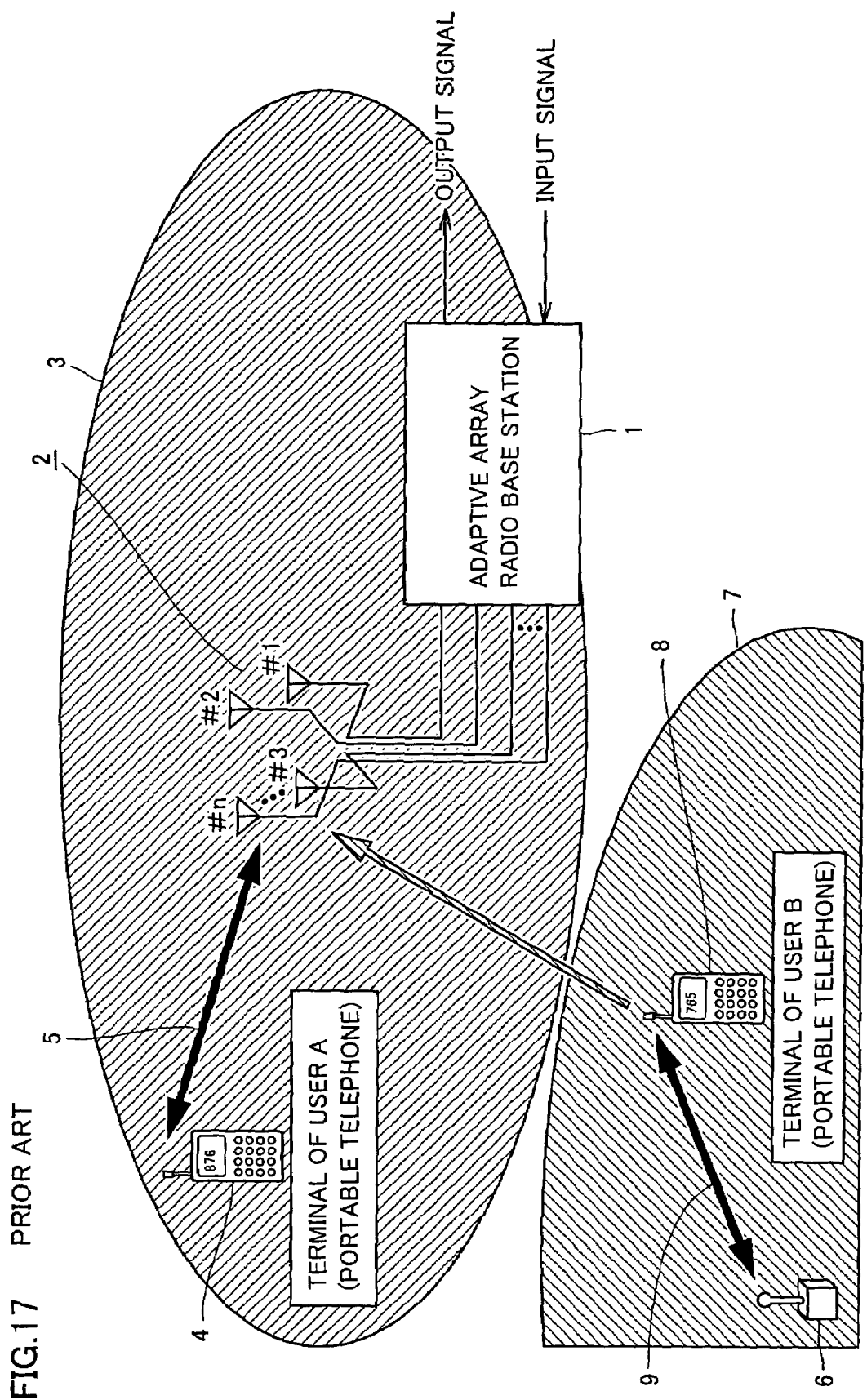
FIG. 17 is a model diagram conceptually showing basic operations of adaptive array radio base stations.
Figure 18:
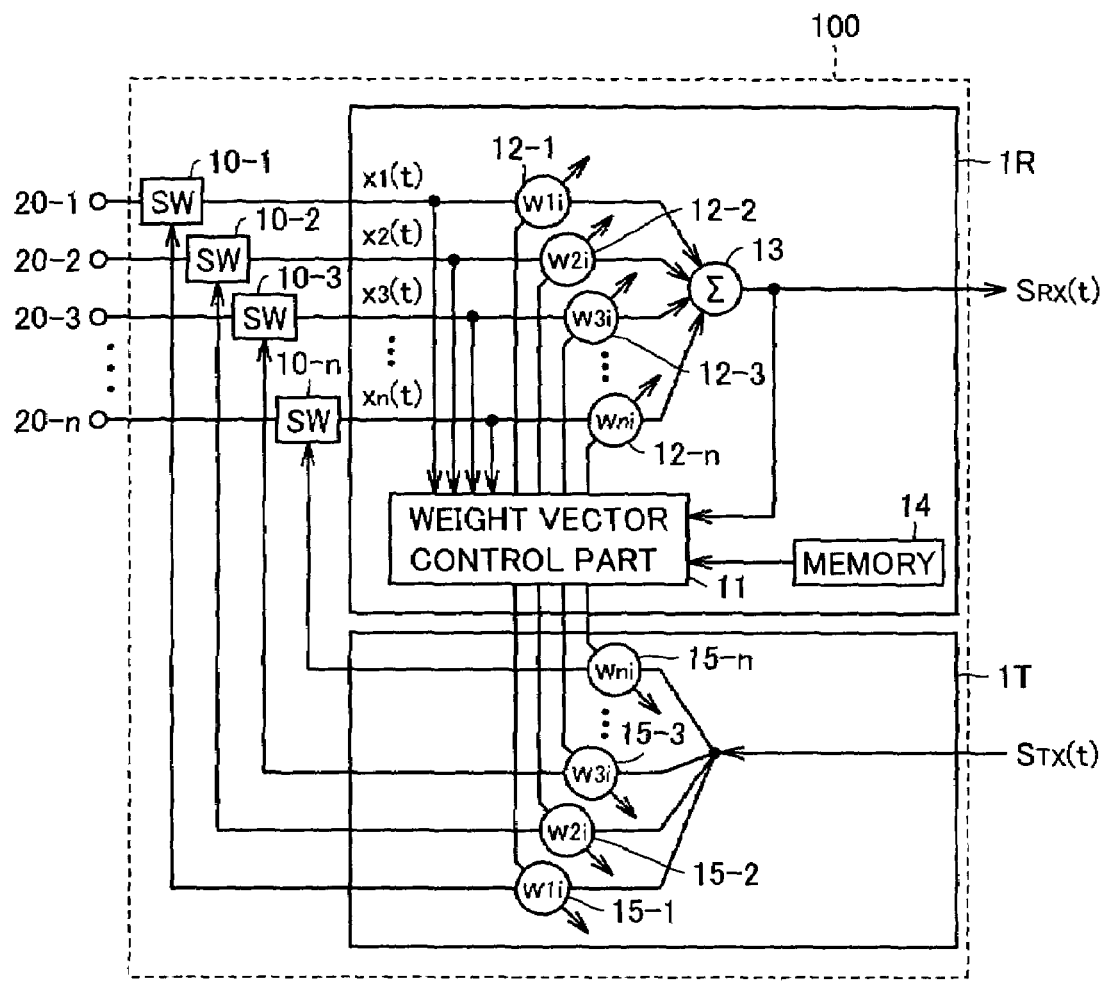
FIG. 18 is a schematic block diagram showing the structure of a conventional adaptive array radio apparatus.
Figure 19:
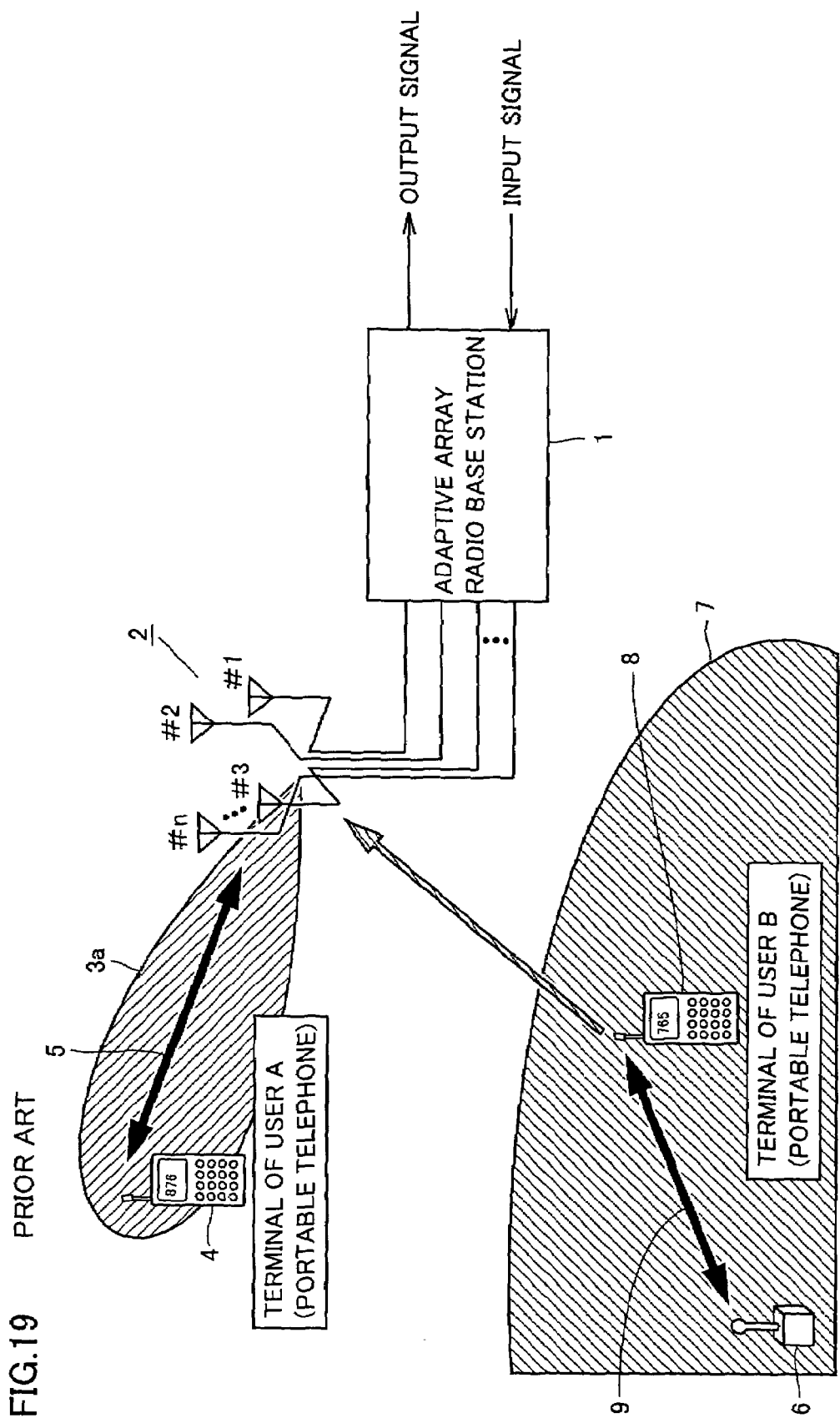
FIG. 19 is a model diagram imaging transmission/reception of a radio signal between an adaptive array base station and a user.
Figure 20:
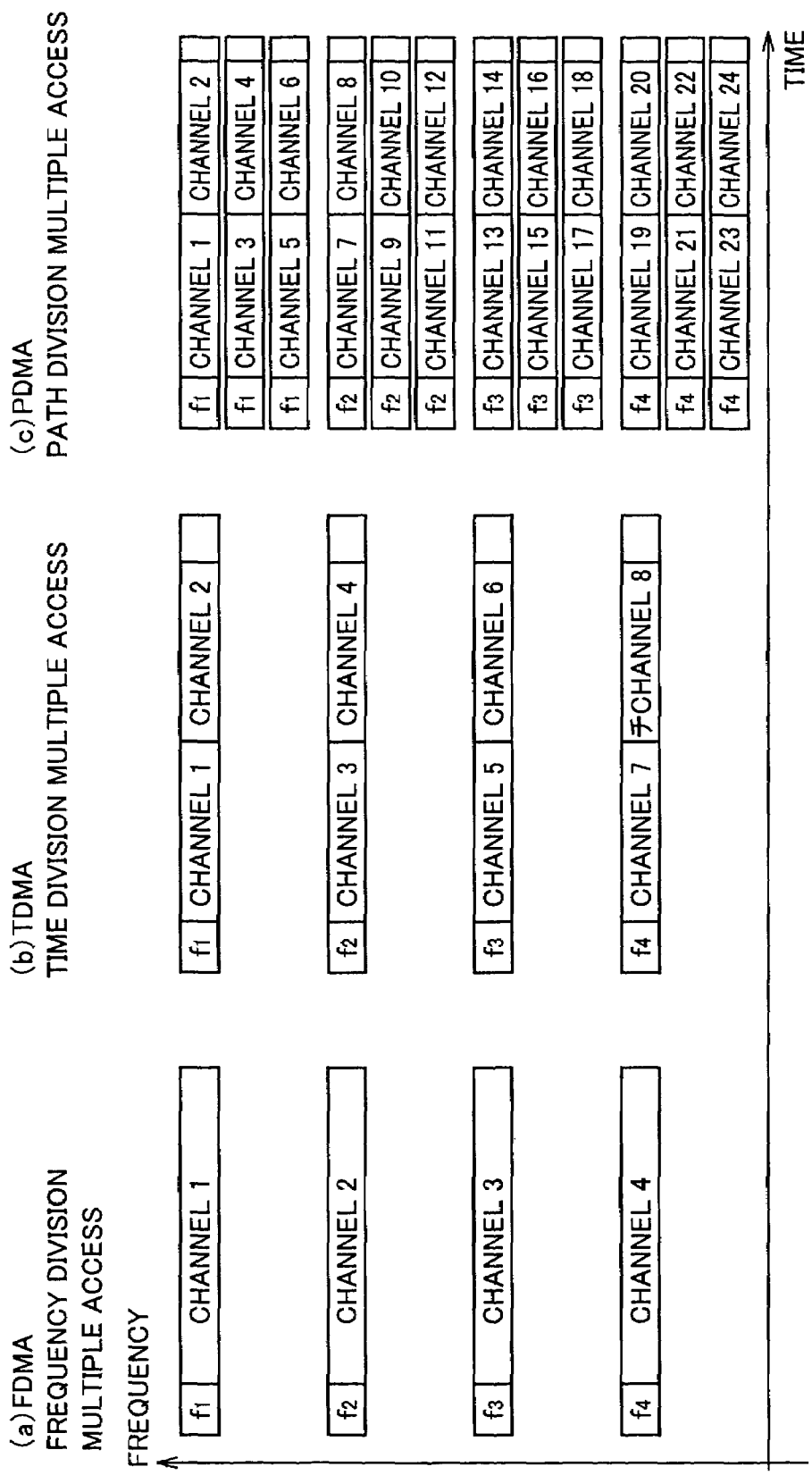
FIG. 20 is a diagram showing the concept of transmission/reception of data between base stations and mobile terminal units.

FIG. 16 is a flow chart illustrating the processing for deriving the transmit weight vector $Wtx_i$ according to the third embodiment in the aforementioned manner, which corresponds to steps S21–S26 of FIG. 11.

Referring to FIG. 16, calculation of the transmit weight vector $Wtx_i$ is started at a step S400 for supplying results of the number M of spatial multiplex users and received power $P_i$ thereof from a received power measuring circuit 2600 to a transmit weight vector control part 2410.

Then, the transmit weight vector control unit 2410 initializes the value of a parameter i for identifying each user to 1 (step S404).

Then, a determination is made as to whether or not the received power $P_i$ is equal to or greater than the predetermined maximum value $P_{max}$ (step S406).

If the received power $P_i$ is equal to or greater than the maximum value $P_{max}$ (step S406), the transmit weight vector control unit 2410 calculates the transmit weight vector $Wtx_i$ in accordance with the equation (32) and stores the same in a memory (step S408).

If the received power $P_i$ is less than the maximum value $P_{max}$, the transmit weight vector control unit 2410 calculates the transmit weight vector $Wtx_i$ in accordance with the equation (33) and stores the same in the memory (step S410).

Then, a determination is made as to whether or not the value of the parameter i is equal to or greater than the number M of users (step S412), and if the value of the parameter i is less than the number M of the users, the value of the parameter i is incremented by 1 (step S414) and the processing returns to the step S406.

If the value of the parameter i is equal to or greater than the number M of the users (step S412), calculation of the transmit weight vector $Wtx_i$ is terminated (step S416).

Processing similar to the above is performed also in a transmit weight vector control unit 2510.

By the method shown in FIG. 16 also, the transmit weight vector $Wtx_i$ is calculated in response to the distance between a receiving terminal and a base station 1, i.e., in response to the value of the received power $P_i$, and hence transmission power is suppressed to reduce undesired interference to another cell if the terminal is close to the base station 1 while transmission power to a terminal far from the base station 1 is increased to increase the maximum reachable distance in an established manner.

In the second embodiment of the present invention, in addition to the weighting of the transmit weight vector based on the measured fading rate described with reference to the first embodiment, the transmit weight vector is weighted based on the measured received power. Therefore, transmission with a radiowave having more exact transmission power is possible to a user of a terminal of which directivity is deviated by fading. Thus, the transmission directivity can be controlled.

As described above, according to the radio apparatus capable of transmission directivity control, the method and control program of controlling transmission directivity in accordance with the present invention, when transmission/reception of radio signals is to be performed with a terminal of which directivity is deviated because of fading, transmission power from the base station is increased in accordance with the magnitude of fading rate of the user, whereby the transmission directivity control can be recovered.

Further, when combined with the conventional transmission power control based on the measurement of received power, more exact transmission directivity control is realized.

INDUSTRIAL APPLICABILITY

According to the present invention, transmission directivity control for a user of which directivity is deviated because of fading can be recovered, and therefore the present invention is effective in a radio apparatus having transmission directivity for path division multiple access among a plurality of terminal units.

The invention claimed is:

1. A radio apparatus having transmission directivity for performing path division multiple access with a plurality of terminal units through adaptive array signal processing, comprising:
   receiving means (2100) for separating a received signal from a specific one of said terminal units from a received radio signal, said receiving means including
   a plurality of received signal separating means (2110, 2120, 2130, 2140, 2210, 2220, 2230, 2240) for multiplying said received radio signal by a reception weight vector corresponding to each said terminal unit thereby extracting said received signal, and
   fading rate measuring means (2300) for measuring fading rate of each of said terminal units;
   said radio apparatus further comprising:
   transmitting means (2400) for generating a transmit signal having directivity to said specific terminal unit, said transmitting means including
   a plurality of transmit signal generating means (2410, 2420, 2510, 2520) for multiplying a transmit signal by a transmit weight vector obtained by weighting said reception weight vector for each said terminal unit in response to the fading rate from said fading rate measuring means thereby generating said transmit signal having directivity.

2. The radio apparatus according to claim 1, wherein said transmitting means multiplies said reception weight vector by a factor proportionate to Xi thereby generating said transmit weight vector for an i-th terminal unit,
   where M (M: natural number) represents the number of said plurality of terminal units, and Xi represents said fading rate from said i-th (i: natural number) terminal unit among said plurality of terminal units.

3. The radio apparatus according to claim 1, wherein said transmitting means multiplies said reception weight vector by a factor proportionate to $(Xi-F_0)$ only when Xi is equal to or greater than a prescribed fading rate $F_0$, thereby generating said transmit weight vector for an i-th terminal unit,
   where M (M: natural number) represents the number of said plurality of terminal units, and Xi represents said fading rate from said i-th (i: natural number) terminal unit among said plurality of terminal units.

4. The radio apparatus according to claim 1, wherein said transmitting means multiplies said reception weight vector by a factor determined in accordance with Xi from a table including a plurality of factors set in advance for every prescribed range of the fading rate, thereby generating said transmit weight vector for an i-th terminal unit,
   where M (M: natural number) represents the number of said plurality of terminal units, and Xi represents said fading rate from said i-th (i: natural number) terminal unit among said plurality of terminal units.

5. A radio apparatus having transmission directivity for performing path division multiple access with a plurality of terminal units through adaptive array signal processing, comprising:

receiving means (2100) for separating a received signal from a specific one of said terminal units from a received radio signal, said receiving means including a plurality of received signal separating means (2110, 2120, 2130, 2140, 2210, 2220, 2230, 2240) for multiplying said received radio signal by a reception weight vector corresponding to each said terminal unit thereby extracting said received signal, received strength measuring means (2600) for measuring received radio strength of each said terminal unit, and fading rate measuring means (2300) for measuring fading rate of each of said terminal units;

said radio apparatus further comprising:

transmitting means (2400) for generating a transmit signal having directivity to said specific terminal unit, said transmitting means including a plurality of transmit signal generating means (2410, 2420, 2510, 2520) for multiplying a transmit signal by a transmit weight vector obtained by weighting said reception weight vector for each said terminal unit in response to the received radio strength from said received strength measuring means and the fading rate from said fading rate measuring means thereby generating said transmit signal having directivity.

6. The radio apparatus according to claim 5, wherein said transmitting means multiplies said reception weight vector by a factor proportionate to Xi thereby generating said transmit weight vector for an i-th terminal unit, where M (M: natural number) represents the number of said plurality of terminal units, and Xi represents said fading rate from said i-th (i: natural number) terminal unit among said plurality of terminal units.

7. The radio apparatus according to claim 5, wherein said transmitting means multiplies said reception weight vector by a factor proportionate to (Xi–$F_0$) only when Xi is equal to or greater than a prescribed fading rate $F_0$, thereby generating said transmit weight vector for an i-th terminal unit, where M (M: natural number) represents the number of said plurality of terminal units, and Xi represents said fading rate from said i-th (i: natural number) terminal unit among said plurality of terminal units.

8. The radio apparatus according to claim 5, wherein said transmitting means multiplies said reception weight vector by a factor determined in accordance with Xi from a table including a plurality of factors set in advance for every prescribed range of the fading rate, thereby generating said transmit weight vector for an i-th terminal unit, where M (M: natural number) represents the number of said plurality of terminal units, and Xi represents said fading rate from said i-th (i: natural number) terminal unit among said plurality of terminal units.

9. A method of controlling a radio apparatus having transmission directivity for performing path division multiple access with a plurality of terminal units through adaptive array signal processing, comprising the steps of:

deriving a reception weight vector corresponding to each said terminal unit in real time and separating a received signal from said terminal unit;

measuring fading rate of each of said terminal units;

deriving a transmit weight vector obtained by weighting said reception weight vector in accordance with said measured fading rate for each said terminal unit; and multiplying a transmit signal by said transmit weight vector to generate a transmit signal having directivity.

10. The method of controlling a radio apparatus according to claim 9, wherein in said step of weighting said reception vector, said transmit weight vector for an i-th terminal unit is generated by multiplying said reception weight vector by a factor proportionate to Xi, where M (M: natural number) represents the number of said plurality of terminal units, and Xi represents said fading rate from said i-th (i: natural number) terminal unit among said plurality of terminal units.

11. The method of controlling a radio apparatus according to claim 9, wherein in said step of weighting said reception vector, said transmit weight vector for an i-th terminal unit is generated by multiplying said reception weight vector by a factor proportionate to (Xi–$F_0$) only when Xi is equal to or greater than a prescribed fading rate $F_0$, where M (M: natural number) represents the number of said plurality of terminal units, and Xi represents said fading rate from said i-th (i: natural number) terminal unit among said plurality of terminal units.

12. The method of controlling a radio apparatus according to claim 9, wherein in said step of weighting said reception vector, said transmit weight vector for an i-th terminal unit is generated by multiplying said reception weight vector by a factor determined in accordance with Xi from a table including a plurality of factors set in advance for every prescribed range of the fading rate, where M (M: natural number) represents the number of said plurality of terminal units, and Xi represents said fading rate from said i-th (i: natural number) terminal unit among said plurality of terminal units.

13. A method of controlling a radio apparatus having transmission directivity for performing path division multiple access with a plurality of terminal units through adaptive array signal processing, comprising the steps of:

deriving a reception weight vector corresponding to each said terminal unit in real time and separating a received signal from said terminal unit;

measuring received radio strength of each said terminal unit on the basis of a received radio signal and said separated received signal;

measuring fading rate of each of said terminal units;

deriving a transmit weight vector obtained by weighting said reception weight vector in accordance with said measured received radio strength and fading rate for each said terminal unit; and multiplying a transmit signal by said transmit weight vector to generate a transmit signal having directivity.

14. The method of controlling a radio apparatus according to claim 13, wherein in said step of weighting said reception vector, said transmit weight vector for an i-th terminal unit is generated by multiplying said reception weight vector by a factor proportionate to Xi, where M (M: natural number) represents the number of said plurality of terminal units, and Xi represents said fading rate from said i-th (i: natural number) terminal unit among said plurality of terminal units.

15. The method of controlling a radio apparatus according to claim 13, wherein
in said step of weighting said reception vector,
said transmit weight vector for an i-th terminal unit is generated by multiplying said reception weight vector by a factor proportionate to $(Xi-F_0)$ only when Xi is equal to or greater than a prescribed fading rate $F_0$,
where M (M: natural number) represents the number of said plurality of terminal units, and Xi represents said fading rate from said i-th (i: natural number) terminal unit among said plurality of terminal units.

16. The method of controlling a radio apparatus according to claim 13, wherein
in said step of weighting said reception vector,
said transmit weight vector for an i-th terminal unit is generated by multiplying said reception weight vector by a factor determined in accordance with Xi from a table including a plurality of factors set in advance for every prescribed range of the fading rate,
where M (M: natural number) represents the number of said plurality of terminal units, and Xi represents said fading rate from said i-th (i: natural number) terminal unit among said plurality of terminal units.

17. A computer-readable medium encoded with a computer program for a radio apparatus having transmission directivity for performing path division multiple access with a plurality of terminal units through adaptive array signal processing, for making a computer execute the steps of:
deriving a reception weight vector corresponding to each said terminal unit in real time and separating a received signal from said terminal unit;
measuring fading rate of each of said terminal units;
deriving a transmit weight vector obtained by weighting said reception weight vector in accordance with said measured fading rate for each said terminal unit; and
multiplying a transmit signal by said transmit weight vector to generate a transmit signal having directivity.

18. The computer-readable medium encoded with a computer program for a radio apparatus having transmission directivity according to claim 17, wherein
in said step of weighting said reception vector,
said transmit weight vector for an i-th terminal unit is generated by multiplying said reception weight vector by a factor proportionate to Xi,
where M (M: natural number) represents the number of said plurality of terminal units, and Xi represents said fading rate from said i-th (i: natural number) terminal unit among said plurality of terminal units.

19. The computer-readable medium encoded with a computer program for a radio apparatus having transmission directivity according to claim 17, wherein
in the step of weighting said reception vector,
said transmit weight vector for an i-th terminal unit is generated by multiplying said reception weight vector by a factor proportionate to $(Xi-F_0)$ only when Xi is equal to or greater than a prescribed fading rate $F_0$,
where M (M: natural number) represents the number of said plurality of terminal units, and Xi represents said fading rate from said i-th (i: natural number) terminal unit among said plurality of terminal units.

20. The computer-readable medium encoded with a computer program for a radio apparatus having transmission directivity according to claim 17, wherein
in said step of weighting said reception vector,
said transmit weight vector for an i-th terminal unit is generated by multiplying said reception weight vector by a factor determined in accordance with Xi from a table including a plurality of factors set in advance for every prescribed range of the fading rate,
where M (M: natural number) represents the number of said plurality of terminal units, and Xi represents said fading rate from said i-th (i: natural number) terminal unit among said plurality of terminal units.

21. The computer-readable medium encoded with a computer program for a radio apparatus having transmission directivity for performing path division multiple access with a plurality of terminal units through adaptive array signal processing, for making a computer execute the steps of:
deriving a reception weight vector corresponding to each said terminal unit in real time and separating a received signal from said terminal unit;
measuring received radio strength of each said terminal unit on the basis of a received radio signal and said separated received signal;
measuring fading rate of each of said terminal units;
deriving a transmit weight vector obtained by weighting said reception weight vector in accordance with said measured received radio strength and fading rate for each said terminal unit; and
multiplying a transmit signal by said transmit weight vector to generate a transmit signal having directivity.

22. The computer-readable medium encoded with a computer program for a radio apparatus having transmission directivity according to claim 21, wherein
in said step of weighting said reception vector,
said transmit weight vector for an i-th terminal unit is generated by multiplying said reception weight vector by a factor proportionate to Xi,
where M (M: natural number) represents the number of said plurality of terminal units, and Xi represents said fading rate from said i-th (i: natural number) terminal unit among said plurality of terminal units.

23. The computer-readable medium encoded with a computer program for a radio apparatus having transmission directivity according to claim 21, wherein
in said step of weighting said reception vector,
said transmit weight vector for an i-th terminal unit is generated by multiplying
said reception weight vector by a factor proportionate to $(Xi-F_0)$ only when Xi is equal to or greater than a prescribed fading rate $F_0$,
where M (M: natural number) represents the number of said plurality of terminal units, and Xi represents said fading rate from said i-th (i: natural number) terminal unit among said plurality of terminal units.

24. The computer-readable medium encoded with a computer program for a radio apparatus having transmission directivity according to claim 21, wherein
in said step of weighting said reception vector,
said transmit weight vector for an i-th terminal unit is generated by multiplying said reception weight vector by a factor determined in accordance with Xi from a table including a plurality of factors set in advance for every prescribed range of the fading rate,
where M (M: natural number) represents the number of said plurality of terminal units, and Xi represents said fading rate from said i-th (i: natural number) terminal unit among said plurality of terminal units.

* * * * *